US012451182B2

(12) United States Patent
Kim et al.

(10) Patent No.: US 12,451,182 B2
(45) Date of Patent: Oct. 21, 2025

(54) NONVOLATILE MEMORY DEVICE

(71) Applicant: SAMSUNG ELECTRONICS CO., LTD., Suwon-si (KR)

(72) Inventors: Youse Kim, Suwon-si (KR); Hyunggon Kim, Suwon-si (KR); Bongsoon Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 188 days.

(21) Appl. No.: 18/219,369

(22) Filed: Jul. 7, 2023

(65) Prior Publication Data
US 2024/0170048 A1 May 23, 2024

(30) Foreign Application Priority Data

Nov. 23, 2022 (KR) .................. 10-2022-0158384

(51) Int. Cl.
*G11C 11/4099* (2006.01)
*G11C 11/408* (2006.01)
*G11C 11/4093* (2006.01)

(52) U.S. Cl.
CPC ...... *G11C 11/4093* (2013.01); *G11C 11/4085* (2013.01); *G11C 11/4087* (2013.01)

(58) Field of Classification Search
CPC ............ G11C 11/4093; G11C 11/4085; G11C 11/4087
See application file for complete search history.

(56) References Cited

U.S. PATENT DOCUMENTS

| 10,726,887 | B2 * | 7/2020 | Kim ...................... G11C 16/10 |
| 10,825,827 | B2 | 11/2020 | Dunga et al. |
| 10,878,907 | B1 | 12/2020 | Chibvongodze et al. |
| 10,978,481 | B2 | 4/2021 | Lim et al. |
| 11,282,849 | B2 | 3/2022 | Oh |
| 11,763,879 | B2 * | 9/2023 | Kim ................... G11C 11/4087 365/185.18 |
| 2012/0120725 | A1 | 5/2012 | Ahn et al. |
| 2021/0091105 | A1 * | 3/2021 | Kim ...................... H10B 43/35 |
| 2021/0257384 | A1 | 8/2021 | Jeong et al. |
| 2022/0036954 | A1 | 2/2022 | Yu et al. |
| 2022/0085056 | A1 * | 3/2022 | Zhang ................... H10B 43/10 |
| 2022/0122651 | A1 | 4/2022 | Kim et al. |
| 2022/0366993 | A1 | 11/2022 | Kim et al. |

OTHER PUBLICATIONS

Communication issued Feb. 2, 2024 by the European Patent Office in European Patent Application No. 23191695.8.

* cited by examiner

*Primary Examiner* — Min Huang
(74) *Attorney, Agent, or Firm* — Sughrue Mion, PLLC

(57) ABSTRACT

A nonvolatile memory device includes a first semiconductor layer and a second semiconductor layer. The first semiconductor layer includes word-lines, bit-lines and a memory cell array which includes one or more memory blocks spaced apart from each other, one or more dummy blocks between the one or more memory blocks and a through-hole via region. The second semiconductor layer is under the first semiconductor layer includes a control circuit. The control circuit divides each of the one or more dummy blocks into an adjacent sub-block directly contacting the through-hole via region and a non-adjacent sub-block based on a relative distance from the through-hole via region in the first direction and uses each of the non-adjacent sub-blocks as a sub-block to store data.

20 Claims, 27 Drawing Sheets

NONVOLATILE MEMORY DEVICE

CROSS-REFERENCE TO RELATED APPLICATION

This application claims priority to Korean Patent Application No. 10-2022-0158384, filed on Nov. 23, 2022, in the Korean Intellectual Property Office (KIPO), the disclosure of which is incorporated by reference herein in its entirety.

BACKGROUND

1. Field

Example embodiments generally relate to memory devices, and more particularly to nonvolatile memory devices.

2. Related Art

Semiconductor memory devices for storing data include volatile memory devices and nonvolatile memory devices. Volatile memory devices, such as dynamic random access memory (DRAM) devices, are typically configured to store data by charging or discharging capacitors in memory cells, and lose the stored data when power is off. Nonvolatile memory devices, such as flash memory devices, may maintain stored data even when power is interrupted. Volatile memory devices are widely used as main memories of various apparatuses, while nonvolatile memory devices are widely used for storing program codes and/or data in various electronic devices, such as computers, mobile devices, etc.

Recently, nonvolatile memory devices of three-dimensional structure such as a vertical NAND memory devices have been developed to increase integration degree and memory capacity of the nonvolatile memory devices.

SUMMARY

Some example embodiments provide a nonvolatile memory device capable of using a portion of a dummy block for storing data.

Some example embodiments provide a nonvolatile memory device capable of using a portion of an edge block for storing data.

According to some example embodiments, a nonvolatile memory device includes: a first semiconductor layer including: a plurality of word-lines extending in a first direction; a plurality of bit-lines extending in a second direction that crosses the first direction; and a memory cell array including one or more memory blocks spaced apart from each other in the second direction, one or more dummy blocks between the one or more memory blocks and a through-hole via region, the memory cell array being connected to the plurality of word-lines and the plurality of bit-lines; and second semiconductor layer under the first semiconductor layer in a third direction perpendicular to the first and second directions, the second semiconductor layer including: a substrate; an address decoder configured to control the memory cell array; a page buffer circuit connected to the plurality of bit-lines through one or more bit-line through-hole vias formed in the through-hole via region; and a control circuit configured to control the address decoder and the page buffer circuit. The control circuit is further configured to: divide each of the one or more dummy blocks into an adjacent sub-block directly contacting the through-hole via region and a non-adjacent sub-block based on a relative distance from the through-hole via region in the second direction; and use the non-adjacent sub-block of each of the one or more dummy blocks as a sub-block to store data.

According to some example embodiments, a nonvolatile memory device includes: a first semiconductor layer including: a plurality of word-lines extending in a first direction; a plurality of bit-lines extending in a second direction that crosses the first direction; and a memory cell array including one or more memory blocks spaced apart from each other in the second direction, one or more dummy blocks between the one or more memory blocks and a through-hole via region, the memory cell array being connected to the plurality of word-lines and the plurality of bit-lines; and a second semiconductor layer under the first semiconductor layer in a third direction perpendicular to the first and second directions, the second semiconductor layer including: a substrate; an address decoder configured to control the memory cell array; a page buffer circuit connected to the plurality of bit-lines through one or more bit-line through-hole vias formed in the through-hole via region; and a control circuit configured to control the address decoder and the page buffer circuit. The control circuit is further configured to: divide an edge memory block adjacent to a first edge in the first direction of the memory cell array, from among the one or more memory blocks, into an adjacent edge sub-block directly contacting the first edge and a non-adjacent edge sub-block based on a relative distance from the first edge in the second direction; and use the non-adjacent edge sub-block as a sub-block to store data.

According to some example embodiments, a nonvolatile memory device includes: a first semiconductor layer including: a plurality of word-lines extending in a first direction; a plurality of bit-lines extending in a second direction that crosses the first direction; a memory cell array including one or more memory blocks spaced apart from each other in the second direction, one or more dummy blocks between the one or more memory blocks and a through-hole via region, the memory cell array being connected to the plurality of word-lines and the plurality of bit-lines; and a second semiconductor layer under the first semiconductor layer in a third direction perpendicular to the first and second directions, the second semiconductor layer including: a substrate; an address decoder configured to control the memory cell array; a page buffer circuit connected to the plurality of bit-lines through one or more bit-line through-hole vias formed in the through-hole via region; and a control circuit configured to control the address decoder and the page buffer circuit. The control circuit is further configured to: divide each of the one or more dummy blocks into an adjacent sub-block directly contacting the through-hole via region and a non-adjacent sub-block based on a relative distance from the through-hole via region in the second direction; and use the non-adjacent sub-block of each of the one or more dummy blocks as a sub-block to store data. The adjacent sub-block and the non-adjacent sub-block in each of the one or more dummy blocks are separated by an internal word-line cut region extending in the first direction. The adjacent sub-block of each of the one or more dummy blocks is isolated from the plurality of word-lines by vertical word-line cut region extending in the second direction.

Therefore, the nonvolatile memory device according to example embodiments may use a portion of dummy blocks adjacent to the through-hole via region as a sub-block to store data, which exist for structural and process stabilization, and thus may reduce a size of spare block provided separately by a nonvolatile memory device and may improve the number of gross die which can be obtained from a single wafer.

BRIEF DESCRIPTION OF DRAWINGS

The above and other objects and features will be more clearly understood from the following description, taken in conjunction with the accompanying drawings.

DETAILED DESCRIPTION

Various example embodiments will be described more fully hereinafter with reference to the accompanying drawings, in which some example embodiments are shown. Each example embodiment provided in the following description is not excluded from being associated with one or more features of another example or another example embodiment also provided herein or not provided herein but consistent with the present disclosure. It will be understood that when an element or layer is referred to as being "on," "connected to" or "coupled to" another element or layer, it can be directly on, connected or coupled to the other element or layer, or intervening elements or layers may be present. By contrast, when an element is referred to as being "directly on," "directly connected to" or "directly coupled to" another element or layer, there are no intervening elements or layers present. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c. It will be also understood that, even if a certain step or operation of manufacturing an apparatus or structure is described later than another step or operation, the step or operation may be performed later than the other step or operation unless the other step or operation is described as being performed after the step or operation.

Figure 1:
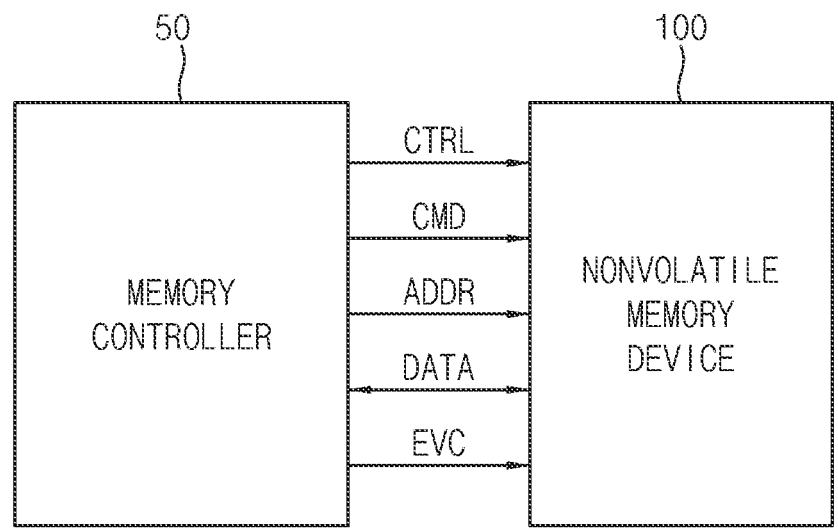
FIG. 1 is a block diagram illustrating a memory system (i.e., a storage device) according to example embodiments.

FIG. 1 is a block diagram illustrating a memory system (i.e., a storage device) according to example embodiments.

Referring to FIG. 1, a memory system 10 may include a memory controller 50 and at least one nonvolatile memory device 100. The memory system 10 may be also referred to as a storage device.

In example embodiments, each of the memory controller 50 and the nonvolatile memory device 100 may be provided in the form of a chip, a package, or a module. Alternatively, the memory controller 50 and the nonvolatile memory device 100 may be packaged into one of various packages.

The nonvolatile memory device 100 may perform an erase operation, a program operation or a write operation under control of the memory controller 50. The nonvolatile memory device 100 receives a command CMD, receives an address ADDR, and transmits and receives data DATA through input/output lines from the memory controller 50 for performing such operations. In addition, the nonvolatile memory device 100 receives a control signal CTRL through a control line from the memory controller 50. In addition, the nonvolatile memory device 100 receives an external voltage EVC through a power line from the memory controller 50.

Figure 2:
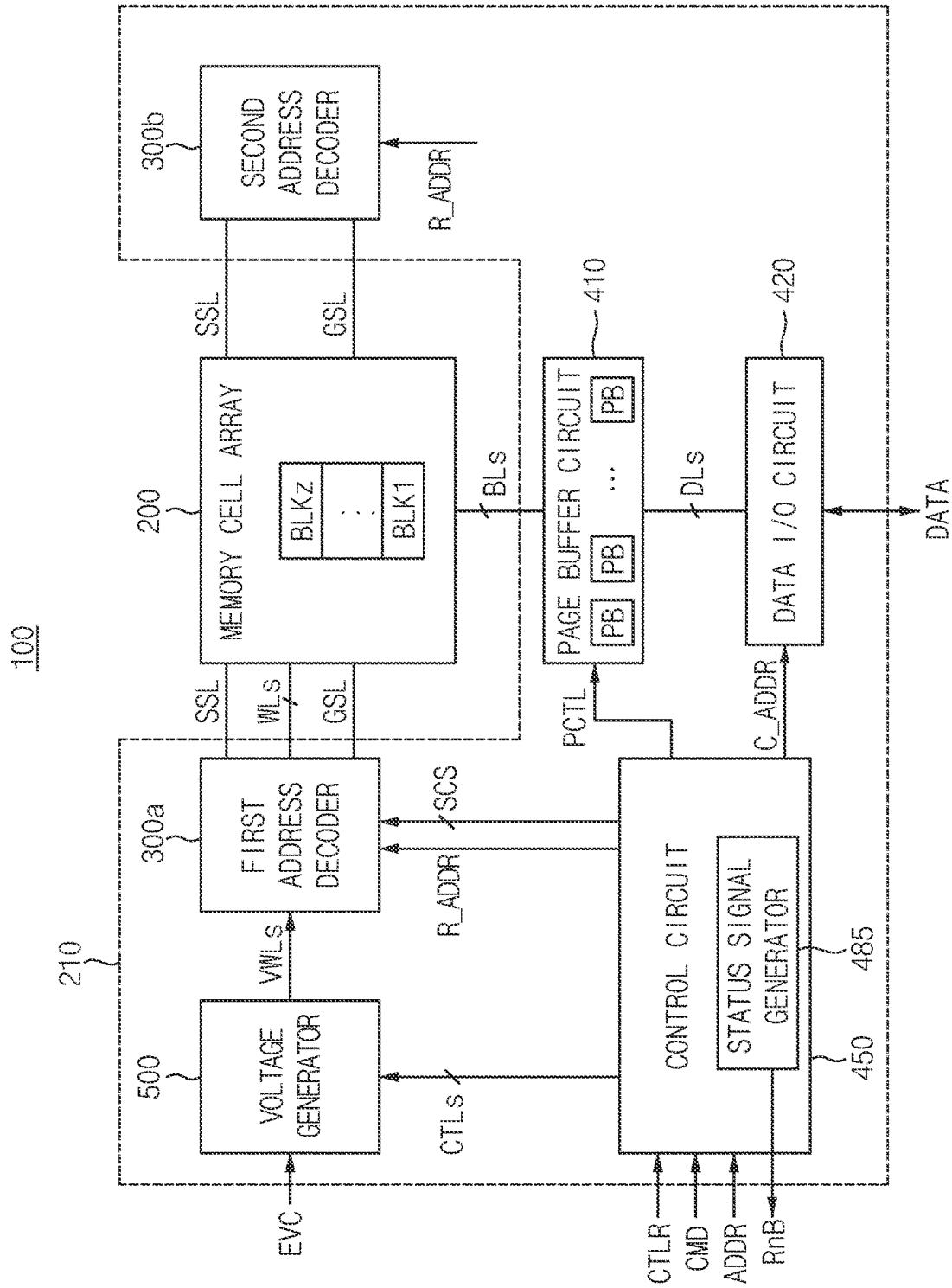
FIG. 2 is a block diagram illustrating the nonvolatile memory device in the memory system of FIG. 1 according to example embodiments.

FIG. 2 is a block diagram illustrating an example of the nonvolatile memory device in the memory system of FIG. 1 according to example embodiments.

Referring to FIG. 2, the nonvolatile memory device 100 may include a memory cell array 200 and a peripheral circuit 210. The peripheral circuit 210 may include a page buffer circuit 410, a data input/output (I/O) circuit 420, a control circuit 450, a voltage generator 500, a first address decoder 300a and a second address decoder 300b. Although not illustrated in FIG. 2, the peripheral circuit 210 may further include an I/O interface, a column logic, a pre-decoder, a temperature sensor, a command decoder, etc.

The memory cell array 200 may be coupled to the first address decoder 300a through a string selection line SSL, a plurality of word-lines WLs, and a ground selection line GSL. The memory cell array 200 may be coupled to the second address decoder 300b through the string selection line SSL and the ground selection line GSL.

In addition, the memory cell array 200 may be coupled to the page buffer circuit 410 through a plurality of bit-lines BLs. The memory cell array 200 may include a plurality of nonvolatile memory cells coupled to the plurality of word-lines WLs and the plurality of bit-lines BLs.

The memory cell array 200 may include a plurality of memory blocks BLK1 through BLKz, and each of the memory blocks BLK1 through BLKz may have a three-dimensional (3D) structure. Here, z is an integer greater than two. The memory cell array 200 may include a plurality of (vertical) cell strings (i.e., NAND cell strings) and each of the cell strings includes a plurality of memory cells stacked with respect to each other.

The control circuit 450 may receive a command CMD, an address ADDR, and a control signal CTRL from the memory controller 50 and may control an erase loop, a program loop and a read operation of the nonvolatile memory device 100. The program loop may include a program operation and a program verification operation, and the erase loop may include an erase operation and an erase verification operation.

In example embodiments, the control circuit 450 may generate control signals CTLs, which are used for controlling the voltage generator 500, based on the command CMD, may generate a page buffer control signal PCTL for controlling the page buffer circuit 410, may generate switching control signals SCS for controlling the address decoder 300 and may generate a row address R_ADDR and a column address C_ADDR based on the address ADDR. The control circuit 450 may provide the control signals CTLs to the voltage generator 500 and may provide the page buffer control signal PCTL to the page buffer circuit 410.

In addition, the control circuit 450 may provide the row address R_ADDR and the switching control signals SCS to the first address decoder 300a, may provide the row address R_ADDR to the second address decoder 300b and provide the column address C_ADDR to the data I/O circuit 420. The control circuit 450 may include a status generator 485 and the status signal generator 485 may generate a status signal RnB indicating an operating status of the nonvolatile memory device 100. The status signal RnB may be referred to as a ready/busy signal because of the status signal RnB indicates either busy state or a ready state of the nonvolatile memory device 100.

The first address decoder 300a may be coupled to the memory cell array 200 through the string selection line SSL, the plurality of word-lines WLs, and the ground selection line GSL and the second address decoder 300b may be coupled to the memory cell array 200 through the string selection line SSL and the ground selection line GSL. During a program operation or a read operation, the first address decoder 300a may determine one of the plurality of word-lines WLs as a selected word-line based on the row address R_ADDR and may determine the plurality of word-lines WLs except the selected word-line as unselected word-lines.

The voltage generator 500 may generate word-line voltages VWLs, a turn-on voltage and a turn-off voltage associated with operations of the nonvolatile memory device 100 using the external voltage EVC provided from the memory controller 50 based on control signals CTLs from the control circuit 450. The word-line voltages VWLs may include a program voltage, a read voltage, a pass voltage, an erase verification voltage, or a program verification voltage. The word-line voltages VWLs may be applied to the plurality of word-lines WLs through the first address decoder 300a and the turn-on voltage and the turn-off voltage may be applied to the string selection line SSL and the ground selection line GSL through the first address decoder 300a and the second address decoder 300b.

For example, during the erase operation, the voltage generator 500 may apply an erase voltage to a well of a selected memory block and may apply a ground voltage to all word-lines of the selected memory block. During the erase verification operation, the voltage generator 500 may apply an erase verification voltage to all word-lines of the selected memory block or may apply the erase verification voltage to the word-lines of the selected memory block by word-line basis.

For example, during the program operation, the voltage generator 500 may apply a program voltage to the selected word-line and may apply a program pass voltage to the unselected word-lines. In addition, during the program verification operation, the voltage generator 500 may apply a program verification voltage to the selected word-line and may apply a verification pass voltage to the unselected word-lines. In addition, during the read operation, the voltage generator 500 may apply a read voltage to the selected word-line and may apply a read pass voltage to the unselected word-lines.

The page buffer circuit 410 may be coupled to the memory cell array 200 through the plurality of bit-lines BLs. The page buffer circuit 410 may include a plurality of page buffers PB. The page buffer circuit 410 may temporarily store data to be programmed in a selected page or data read out from the selected page of the memory cell array 200.

Figure 7:
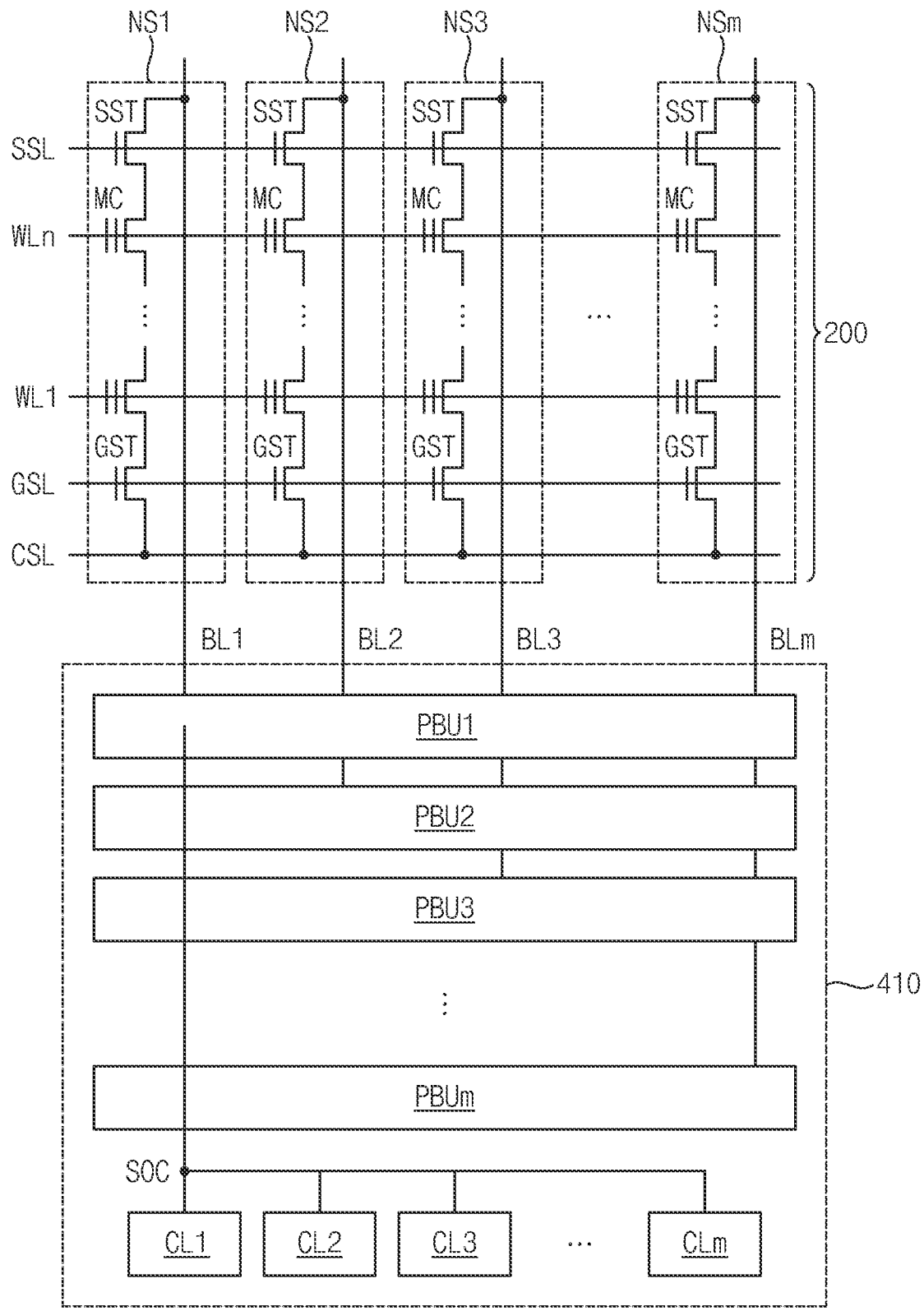
FIG. 7 is a schematic diagram of a connection of the memory cell array to the page buffer circuit in FIG. 2, according to example embodiments.

In example embodiments, page buffer units included in each of the plurality of page buffers PB (for example, first through m-th page buffer units PBU1 through PBUm in FIG. 7) and cache latches included in each of the plurality of page buffers PB (for example, first through m-th cache latches CL1 through CLm in FIG. 7) may be apart from each other, and have separate structures. Here, m is a natural number greater than three. Accordingly, the degree of freedom of wirings on the page buffer units may be improved, and the complexity of a layout may be reduced. In addition, because the cache latches are adjacent to data I/O lines, the distance between the cache latches and the data I/O lines may be reduced, and thus, data I/O speed may be improved.

The data I/O circuit 420 may be coupled to the page buffer circuit 410 through a plurality of data lines DLs. During the program operation, the data I/O circuit 420 may receive program data DATA from the memory controller 50 and provide the program data DATA to the page buffer circuit 410 based on the column address C_ADDR received from the control circuit 450. During the read operation, the data I/O circuit 420 may provide read data DATA to the memory controller 50 based on the column address C_ADDR received from the control circuit 450.

Figure 3:
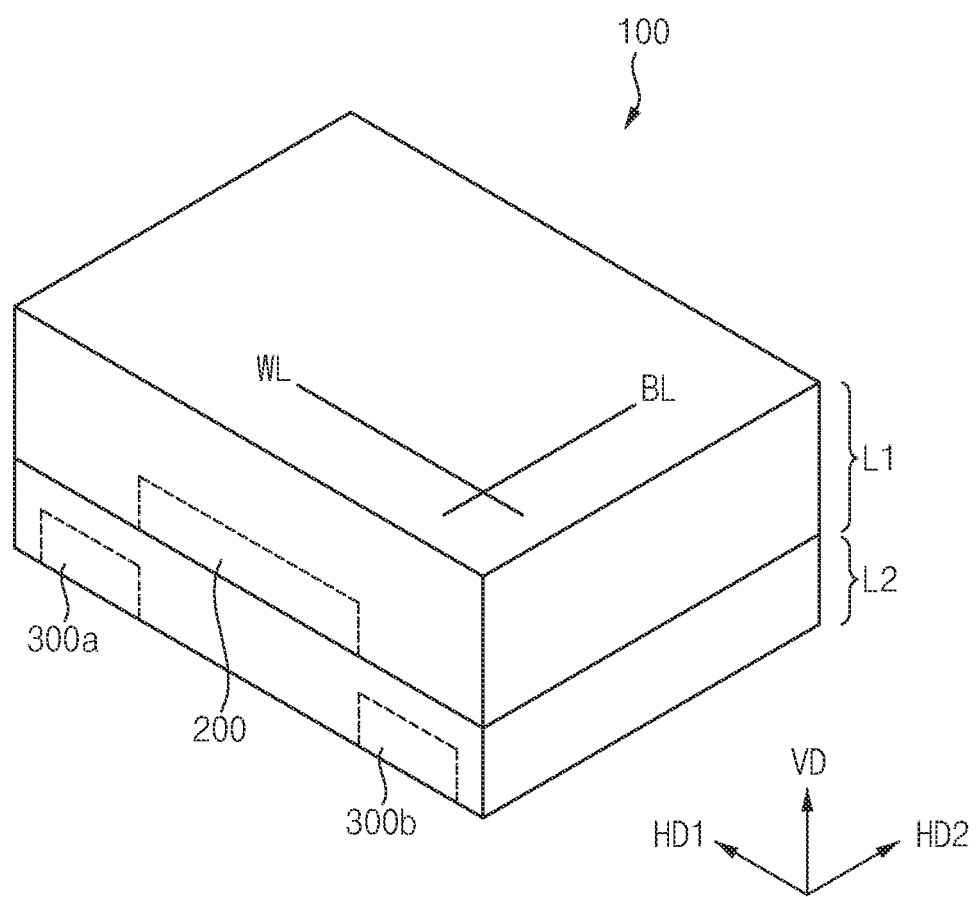
FIG. 3 schematically illustrates a structure of the nonvolatile memory device of FIG. 2 according to example embodiments.

FIG. 3 schematically illustrates a structure of the nonvolatile memory device of FIG. 2 according to example embodiments.

Referring to FIG. 3, the nonvolatile memory device 100 may include a first semiconductor layer L1 and a second semiconductor layer L2, and the first semiconductor layer L1 may be stacked in a third direction (i.e., a vertical direction) VD with respect to the second semiconductor layer L2. The second semiconductor layer L2 may be under the first semiconductor layer L1 in the third direction VD, and accordingly, the second semiconductor layer L2 may be close to a substrate.

In example embodiments, the memory cell array 200 in FIG. 2 may be formed (or, provided) on the first semiconductor layer L1, and the peripheral circuit 210 in FIG. 2 may be formed (or, provided) on the second semiconductor layer L2. In addition, the first address decoder 300a may be disposed under a first side of the memory cell array 200 in the second semiconductor layer L2 and the second address decoder 300b may be disposed under a second side of the memory cell array 200 in the second semiconductor layer L2. The second side may be opposed to the first side.

Accordingly, the nonvolatile memory device 100 may have a structure in which the memory cell array 200 is on the peripheral circuit 210, that is, a cell over periphery (COP) structure. The COP structure may effectively reduce an area in a horizontal direction and improve the degree of integration of the nonvolatile memory device 100.

In example embodiments, the second semiconductor layer L2 may include a substrate, and by forming transistors on the substrate and metal patterns for wiring transistors, the peripheral circuit 210 may be formed in the second semiconductor layer L2. After the peripheral circuit 210 is formed on the second semiconductor layer L2, the first semiconductor layer L1 including the memory cell array 200 may be formed, and the metal patterns for connecting the word-lines WL and the bit-lines BL of the memory cell array 200 to the peripheral circuit 210 formed in the second semiconductor layer L2 may be formed. For example, the word-lines WL may extend in a first direction (i.e., a first horizontal direction) HD1 and the bit-lines BL may extend in a second direction (i.e., a second horizontal direction) HD2 crossing the first direction HD1.

As the number of stages of memory cells in the memory cell array 200 increases with the development of semiconductor processes, that is, as the number of stacked word-lines WL increases, an area of the memory cell array 200 may decrease, and accordingly, an area of the peripheral circuit 210 may be also reduced.

According to an example embodiment, to reduce an area of a region occupied by the page buffer circuit 410, the page buffer circuit 410 may have a structure in which the page buffer unit and the cache latch are separated from each other, and may connect sensing nodes included in each of the page buffer units commonly to a combined sensing node. This will be explained in detail with reference to FIG. 8.

Figure 4:
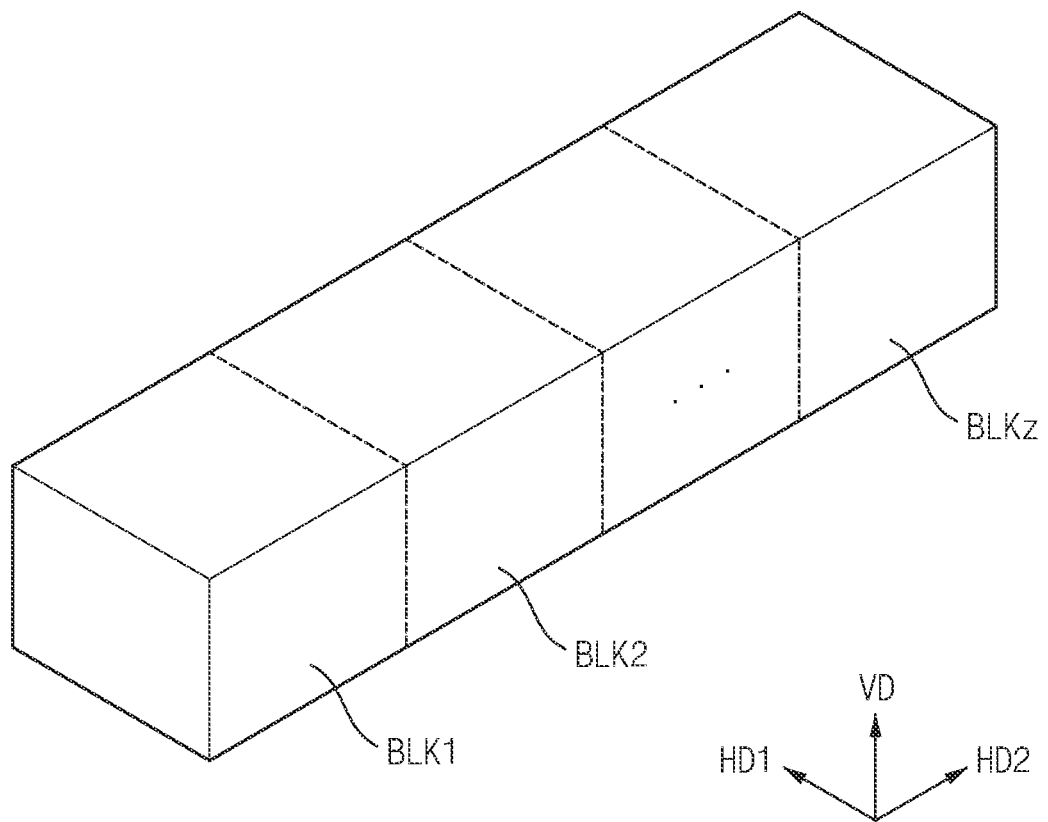
FIG. 4 is a block diagram illustrating an example of the memory cell array in FIG. 2 according to example embodiments.

FIG. 4 is a block diagram illustrating an example of the memory cell array in FIG. 2 according to example embodiments.

Referring to FIG. 4, the memory cell array 200 may include a plurality of memory blocks BLK1 to BLKz which extend along the first direction HD1, the second direction HD2 and the third direction VD. In an example embodiment, the memory blocks BLK1 to BLKz are selected by the first address decoder 300a in FIG. 2. For example, the first address decoder 300a may select a memory block BLK corresponding to a block address among the memory blocks BLK1 to BLKz.

Figure 5:
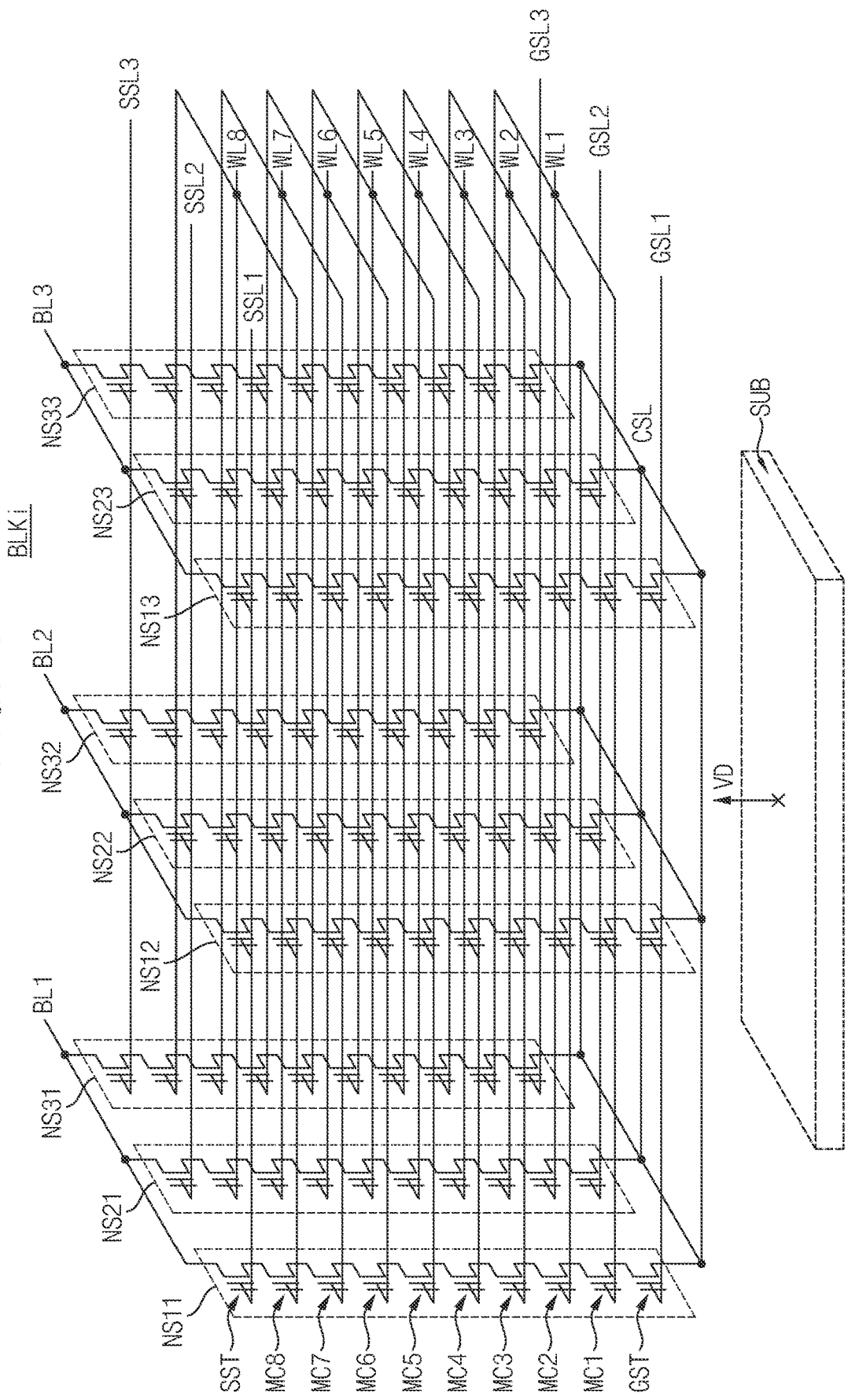
FIG. 5 is a circuit diagram illustrating one of the memory blocks of FIG. 4 according to example embodiments.

FIG. 5 is a circuit diagram illustrating one of the memory blocks of FIG. 4.

The memory block BLKi of FIG. 5 may be formed on a substrate SUB in a three-dimensional structure (or a vertical structure). For example, a plurality of memory cell strings included in the memory block BLKi may be formed in the third direction VD perpendicular to the substrate SUB.

Referring to FIG. 5, the memory block BLKi may include (memory) cell strings NS11 to NS33 coupled between bit-lines BL1, BL2 and BL3 and a common source line CSL. Each of the cell strings NS11 to NS33 may include a string selection transistor SST, a plurality of memory cells MC1 to MC8, and a ground selection transistor GST. In FIG. 5, each of the cell strings NS11 to NS33 is illustrated to include eight memory cells MC1 to MC8. However, example embodiments are not limited thereto. In some example embodiments, each of the cell strings NS11 to NS33 may include any number of memory cells.

The string selection transistor SST may be connected to corresponding string selection lines SSL1 to SSL3. The plurality of memory cells MC1 to MC8 may be connected to corresponding word-lines WL1 to WL8, respectively. The ground selection transistor GST may be connected to corresponding ground selection lines GSL1 to GSL3. The string selection transistor SST may be connected to corresponding bit-lines BL1, BL2 and BL3, and the ground selection transistor GST may be connected to the common source line CSL.

Word-lines (e.g., WL1) at the same vertical level may be commonly connected, and the ground selection lines GSL1 to GSL3 and the string selection lines SSL1 to SSL3 may be separated.

Figure 6:
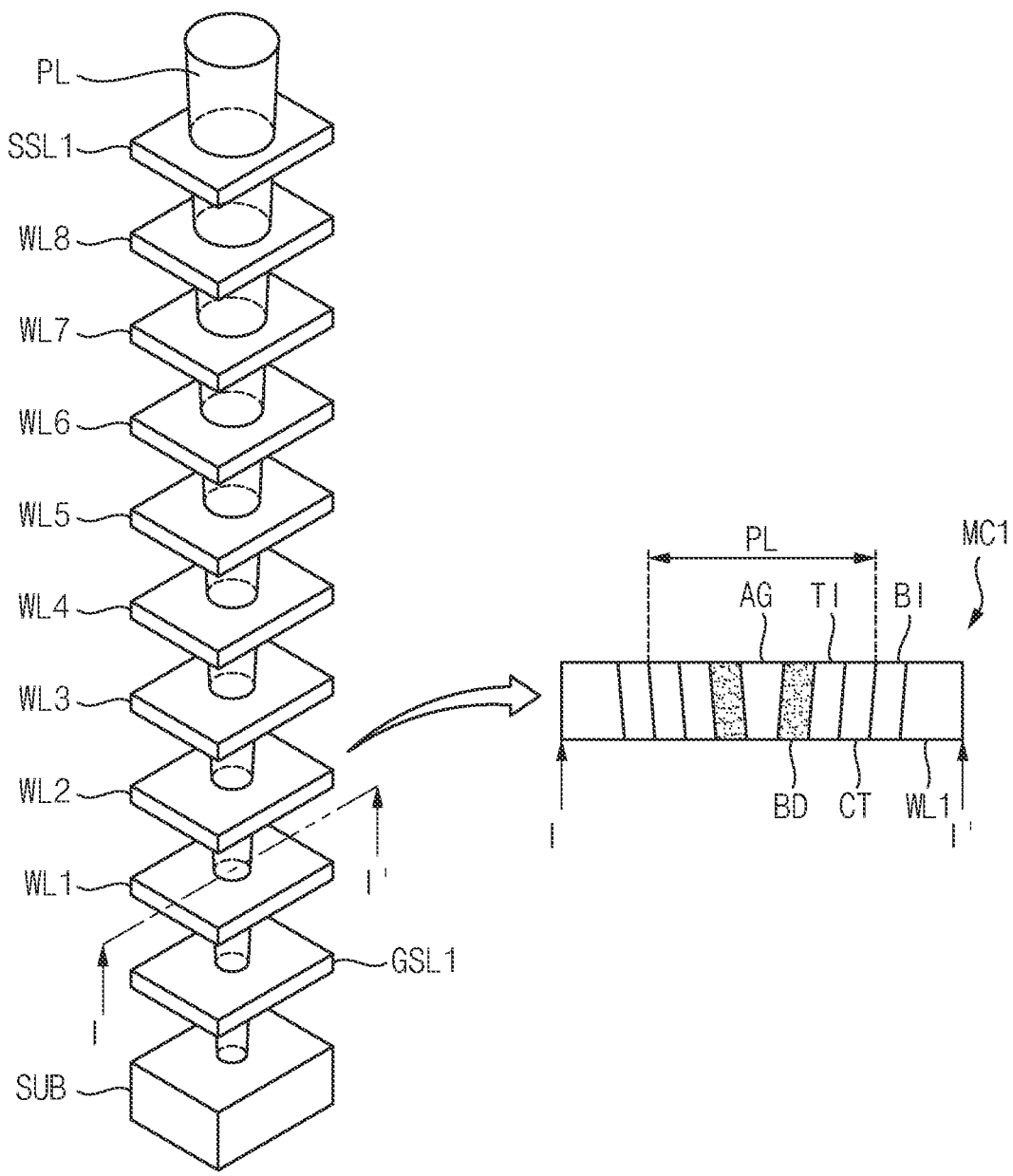
FIG. 6 illustrates an example of a structure of a cell string in the memory block of FIG. 5.

FIG. 6 illustrates an example of a structure of a cell string CS in the memory block of FIG. 5.

Referring to FIGS. 5 and 6, a pillar PL is provided on the substrate SUB such that the pillar PL extends in a direction perpendicular to the substrate SUB and is in contact with the substrate SUB. Each of the ground selection line GSL, the word-lines WL1 to WL8, and the string selection lines SSL illustrated in FIG. 6 may be formed of a conductive material parallel with the substrate SUB, for example, a metallic material. The pillar PL may be in contact with the substrate SUB through the conductive materials forming the string selection lines SSL, the word-lines WL1 to WL8, and the ground selection line GSL.

A sectional view taken along a line I-I' is also illustrated in FIG. 6. The sectional view shows a first memory cell MC1 corresponding to a first word-line WL1. The pillar PL may include a cylindrical body BD. An air gap AG may be defined in the interior of the body BD.

The body BD may include P-type silicon and may be an area where a channel will be formed. The pillar PL may further include a cylindrical tunnel insulating layer TI surrounding the body BD and a cylindrical charge trap layer CT surrounding the tunnel insulating layer TI. A blocking insulating layer BI may be provided between the first word-line WL1 and the pillar PL. The body BD, the tunnel insulating layer TI, the charge trap layer CT, the blocking insulating layer BI, and the first word-line WL1 may constitute or be included in a charge trap type transistor that is formed in a direction perpendicular to the substrate SUB or to an upper surface of the substrate SUB. A string selection transistor SST, a ground selection transistor GST, and other memory cells may have the same structure as the first memory cell MC1.

FIG. 7 is a schematic diagram of a connection of the memory cell array to the page buffer circuit in FIG. 2, according to example embodiments.

Referring to FIG. 7, the memory cell array 200 may include first through m-th cell strings NS1 through NSm, each of the first through m-th cell strings NS1 through NSm may include a ground select transistor GST connected to the ground select line GSL, a plurality of memory cells MC respectively connected to the first through n-th word-lines WL1 through WLn, and a string select transistor SST connected to the string select line SSL, and the ground select transistor GST, the plurality of memory cells MC, and the string select transistor SST may be connected to each other in series. In this case, n may be a positive integer.

The page buffer circuit 410 may include first through m-th page buffer units PBU1 through PBUm. The first page buffer unit PB1 may be connected to the first cell string NS1 via the first bit-line BL1, and the m-th page buffer unit PBUm may be connected to the m-th cell string NSm via the m-th bit-line BLm. For example, m may be 8, and the page buffer circuit 410 may have a structure in which page buffer units of eight stages, or, the first through m-th page buffer units PBU1 through PBUm are in a line. For example, the first through m-th page buffer units PBU1 through PBUm may be in a row in an extension direction of the first through m-th bit-lines BL1 through BLm.

The page buffer circuit 410 may further include first through m-th cache latches CL1 through CLm respectively corresponding to the first through m-th page buffer units PBU1 through PBUm. For example, the page buffer circuit 410 may have a structure in which the cache latches of eight stages or the first through m-th cache latches CL1 through CLm in a line. For example, the first through m-th cache latches CL1 through CLm may be in a row in an extension direction of the first through m-th bit-lines BL1 through BLm.

The sensing nodes of each of the first through m-th page buffer units PBU1 through PBUm may be commonly connected to a combined sensing node SOC. In addition, the first through m-th cache latches CL1 through CLm may be commonly connected to the combined sensing node SOC. Accordingly, the first through m-th page buffer units PBU1 through PBUm may be connected to the first through m-th cache latches CL1 through CLm via the combined sensing node SOC.

Figure 8:
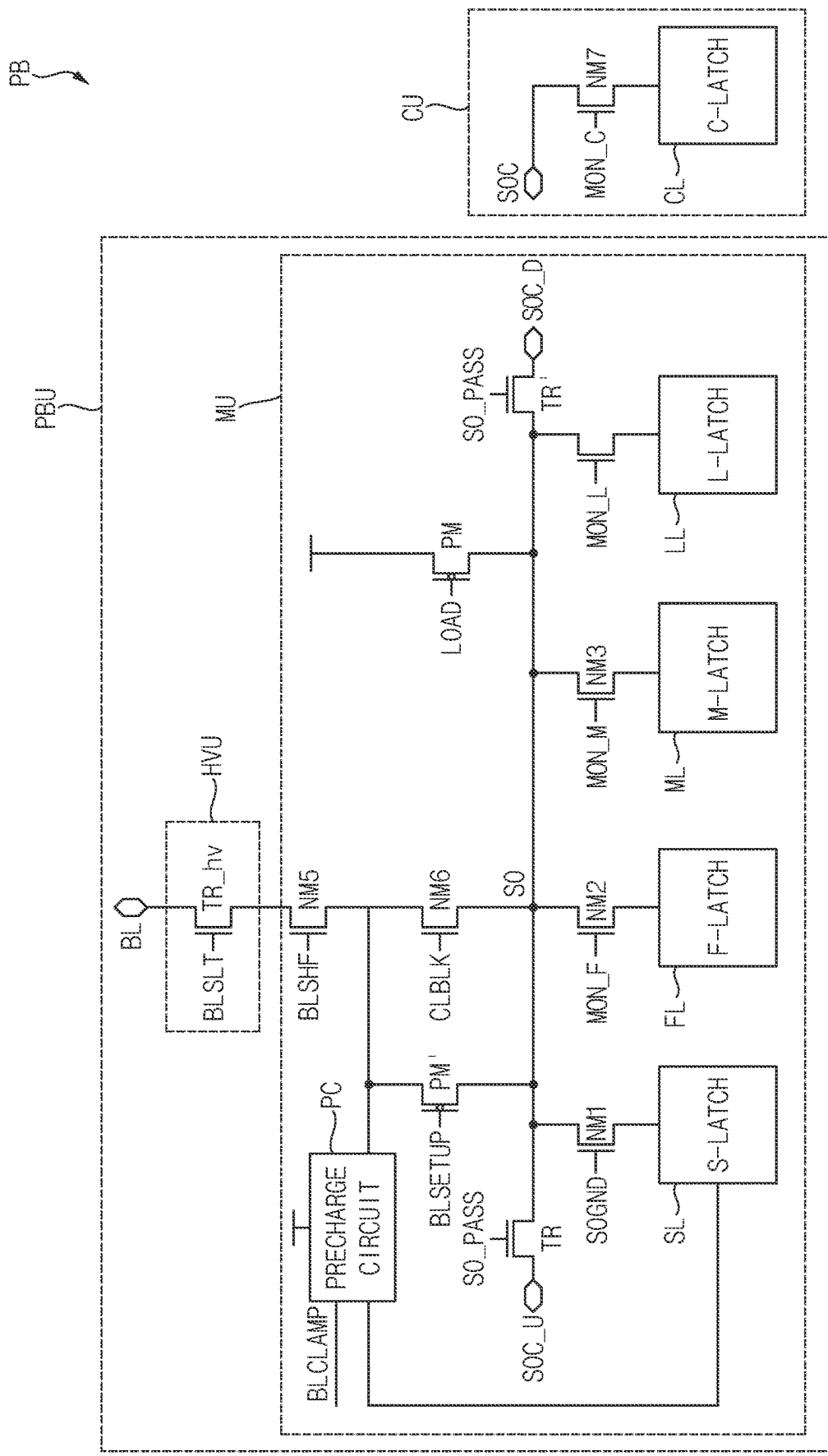
FIG. 8 illustrates in detail a page buffer according to example embodiments.

FIG. 8 illustrates in detail a page buffer according to example embodiments.

Referring to FIG. 8, the page buffer PB may correspond to an example of the page buffer PB in FIG. 2. The page buffer PB may include a page buffer unit PBU and a cache unit CU. Because the cache unit CU includes a cache latch (C-LATCH) CL, and the C-LATCH CL is connected to a data input/output line, the cache unit CU may be adjacent to the data input/output line. Accordingly, the page buffer unit PBU and the cache unit CU may be apart from each other, and the page buffer PB may have a structure in which the page buffer unit PBU and the cache unit CU are apart from each other.

The page buffer unit PBU may include a main unit MU. The main unit MU may include main transistors in the page buffer PB. The page buffer unit PBU may further include a bit-line selection transistor TR_hv that is connected to the bit-line BL and driven by a bit-line selection signal BLSLT. The bit-line select transistor TR_hv may include a high voltage transistor, and accordingly, the bit-line selection transistor TR_hv may be in a different well region from the main unit MU, that is, in a high voltage unit HVU.

The main unit MU may include a sensing latch (S-LATCH) SL, a force latch (F-LATCH) FL, an upper bit latch (M-LATCH) ML and a lower bit latch (L-LATCH) LL. According to an example embodiment, the S-LATCH SL, the F-LATCH FL, the M-LATCH ML, or the L-LATCH LL may be referred to as main latches. The main unit MU may further include a precharge circuit PC capable of controlling a precharge operation on the bit-line BL or a sensing node SO based on a bit-line clamping control signal BLCLAMP, and may further include a transistor PM' driven by a bit-line setup signal BLSETUP.

The S-LATCH SL may, during a read or program verification operation, store data stored in a memory cell MC or a sensing result of a threshold voltage of the memory cell MC. In addition, the S-LATCH SL may, during a program operation, be used to apply a program bit-line voltage or a program inhibit voltage to the bit-line BL. The F-LATCH FL may be used to improve threshold voltage distribution during the program operation. The F-LATCH FL may store force data. The force data is initially set to '1', and is then converted to '0' when the threshold voltage of the memory cell MC enters a forcing region that has a lower voltage than a target region. By utilizing the force data during a program execution operation, the bit-line voltage may be controlled, and the program threshold voltage distribution may be formed narrower.

The M-LATCH ML, the L-LATCH LL, and the C-LATCH CL may be utilized to store data externally input during the program operation, and may be referred to as data latches. When data of 3 bits is programmed in one memory cell MC, the data of 3 bits may be stored in the M-LATCH ML, the L-LATCH LL, and the C-LATCH CL, respectively. Until a program of the memory cell MC is completed, the M-LATCH ML, the L-LATCH LL, and the C-LATCH CL may maintain the stored data. In addition, the C-LATCH CL may receive data read from a memory cell MC during the read operation from the S-LATCH SL, and output the received data to the outside via the data input/output line.

In addition, the main unit MU may further include first through fourth transistors NM1 through NM4. The first transistor NM1 may be connected between the sensing node SO and the S-LATCH SL, and may be driven by a ground control signal SOGND. The second transistor NM2 may be connected between the sensing node SO and the F-LATCH FL, and may be driven by a forcing monitoring signal MON_F. The third transistor NM3 may be connected between the sensing node SO and the M-LATCH ML, and may be driven by a higher bit monitoring signal MON_M. The fourth transistor NM4 may be connected between the sensing node SO and the L-LATCH LL, and may be driven by a lower bit monitoring signal MON_L.

In addition, the main unit MU may further include fifth and sixth transistors NM5 and NM6 connected to each other in series between the bit-line selection transistor TV by and the sensing node SO. The fifth transistor NM5 may be driven by a bit-line shut-off signal BLSHF, and the sixth transistor NM6 may be driven by a bit-line connection control signal CLBLK. In addition, the main unit MU may further include a precharge transistor PM. The precharge transistor PM may be connected to the sensing node SO, which is driven by a load signal LOAD, and may precharge the sensing node SO to a precharge level in a precharge period.

In an example embodiment, the main unit MU may further include a pair of pass transistors connected to the sensing node SO, or first and second pass transistors TR and TR'. According to an example embodiment, the first and second pass transistors TR and TR' may also be referred to as first and second sensing node connection transistors, respectively. The first and second pass transistors TR and TR' may be driven in response to a pass control signal SO_PASS. According to an example embodiment, the pass control signal SO_PASS may be referred to as a sensing node connection control signal. The first pass transistor TR may be connected between a first terminal SOC_U and the sensing node SO, and the second pass transistor TR' may be between the sensing node SO and a second terminal SOC_D.

For example, when the page buffer unit PBU corresponds to the second page buffer unit PBU2 in FIG. 7, the first terminal SOC_U may be connected to one end of the pass transistor included in the first page buffer unit PBU1, and the second terminal SOC_D may be connected to one end of the pass transistor included in the third page buffer unit PBU3. In this manner, the sensing node SO may be electrically connected to the combined sensing node SOC via pass transistors included in each of the third through m-th page buffer units PBU3 through PBUM.

During the program operation, the page buffer PB may verify whether the program is completed in a memory cell MC selected among the memory cells MC included in the NAND string connected to the bit-line BL. The page buffer PB may store data sensed via the bit-line BL during the program verify operation in the S-LATCH SL. The M-LATCH ML and the L-LATCH LL may be set in which target data is stored according to the sensed data stored in the S-LATCH SL.

For example, when the sensed data indicates that the program is completed, the M-LATCH ML and the L-LATCH LL may be switched to a program inhibit setup for the selected memory cell MC in a subsequent program loop. The C-LATCH CL may temporarily store input data provided from the outside. During the program operation, the target data to be stored in the C-LATCH CL may be stored in the M-LATCH ML and the L-LATCH LL.

Signals for controlling elements in the page buffer circuit 410 may be included in the page buffer control signal PCTL in FIG. 2.

Figure 9:
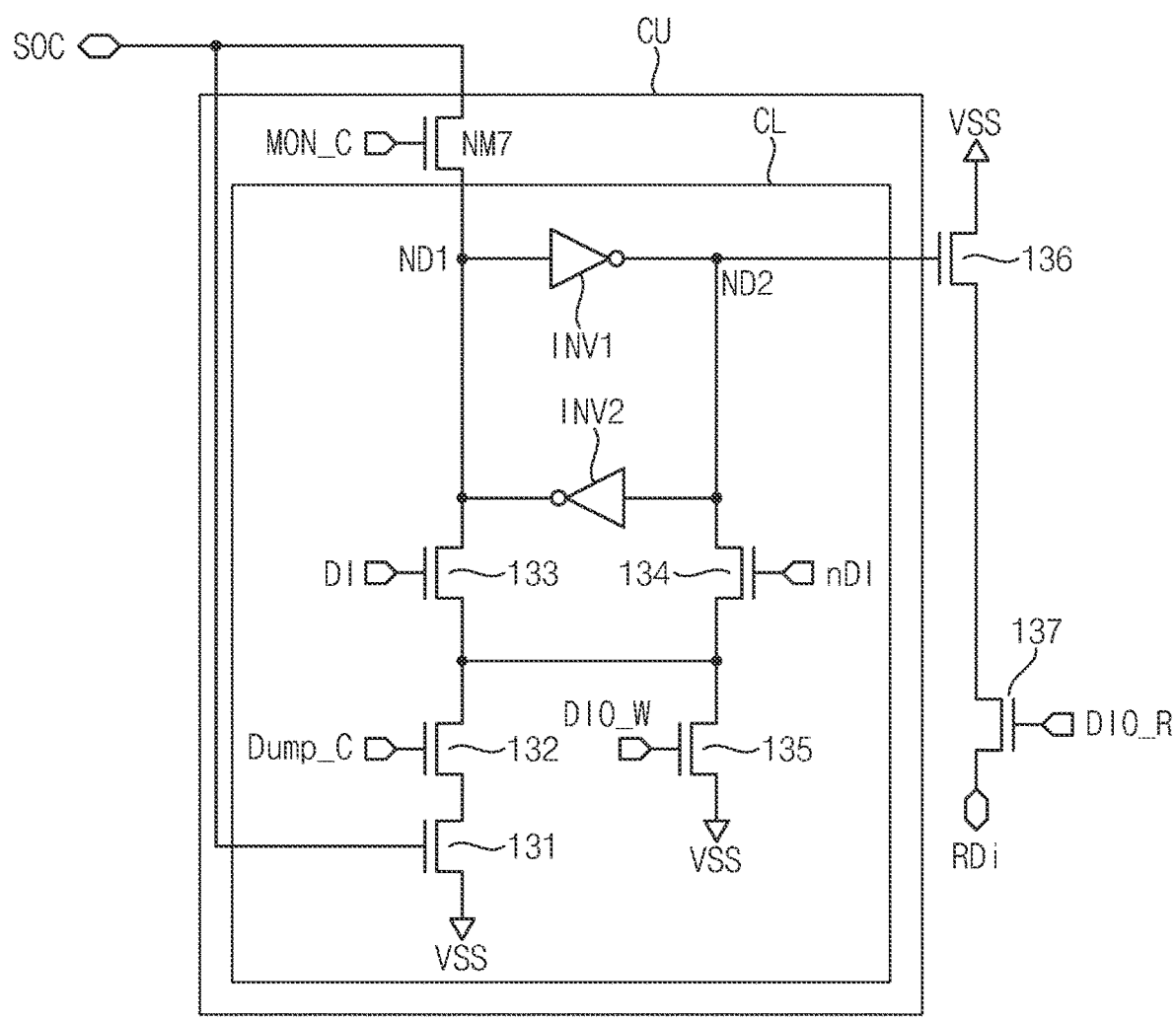
FIG. 9 is a circuit diagram illustrating an example of a cache circuit (e.g., a cache) according to example embodiments.

FIG. 9 is a circuit diagram illustrating an example of the cache unit according to example embodiments.

Referring to FIGS. 8 and 9, the cache unit CU may include the monitor transistor NM7 and the C-LATCH CL, and the C-LATCH CL may include first and second inverters INV1 and INV2, a dump transistor 132, and transistors 131, 133, 134 and 135. The monitor transistor NM7 may be driven based on the cache monitoring signal MON_C, and may control a connection between the coupling sensing node SOC and the C-LATCH CL.

The first inverter INV1 may be connected between the first node ND1 and the second node ND2, the second inverter INV2 may be connected between the second node ND2 and the first node ND1, and thus, the first and second inverters INV1 and INV2 may form a latch. The transistor 131 may include a gate connected to the combined sensing node SOC and may be connected between the dump transistor 132 and a ground voltage VSS.

The dump transistor 132 may be driven by a dump signal Dump_C, and may transmit data stored in the C-LATCH CL to a main latch, for example, the S-LATCH SL in the page buffer unit PBU. The transistor 133 may be driven by a data signal DI, the transistor 134 may be driven by a data inversion signal nDI, and the transistor 135 may be driven by a write control signal DIO_W. When the write control signal DIO_W is activated, voltage levels of the first and second nodes ND1 and ND2 may be determined based on the data signal DI and the data inversion signal nDI, respectively.

The cache unit CU may be connected to a data I/O line (or data I/O terminal) RDi via transistors 136 and 137. The transistor 136 may include a gate connected to the second node ND2, and may be turned on or off based on a voltage level of the second node ND2. The transistor 137 may be driven by a read control signal DIO_R. When the read control signal DIO_R is activated and the transistor 137 is turned on, a voltage level of the input/output terminal RDi may be determined as '1' or '0' based on a state of the C-LATCH CL.

Figure 10:
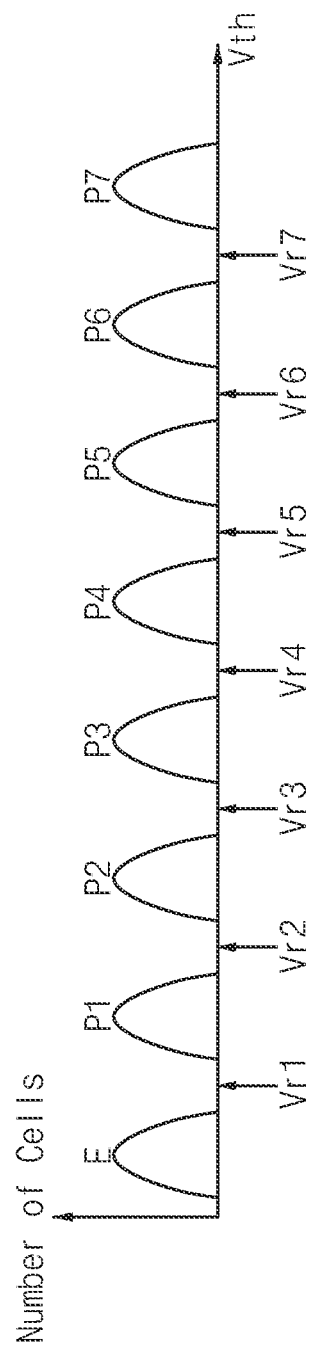
FIG. 10 is a graph showing a threshold voltage distribution of memory cells when a memory cell included in the memory cell array in FIG. 2 is a 3-bit triple level cell according to example embodiments.

FIG. 10 is a graph showing a threshold voltage distribution of memory cells when a memory cell included in the memory cell array in FIG. 2 is a 3-bit triple level cell (TLC).

Referring to FIG. 10, a horizontal axis represents a threshold voltage Vth and the vertical axis represents the number of memory cells. When each of the memory cells is a 3-bit triple level cell programmed to store 3 bits, the memory cell may have one from among an erase state E and first through seventh program states P1 through P7. When a memory cell is a multi-level cell, unlike a single-level cell, because an interval between threshold voltages distributions is small, a small change in the threshold voltage Vth may cause errors.

A first read voltage Vr1 has a voltage level between a distribution of a memory cell having the erase state E and a distribution of a memory cell having the first program state P1. Each of second through seventh read voltages Vr2 through Vr7 have a voltage level between distributions of memory cells having adjacent program states.

In example embodiments, assuming that the first read voltage Vr1 is applied, when a memory cell is turned on, data '1' may be stored, and when the memory cell is turned off, data '0' may be stored. However, example embodiments are not limited thereto, and other example embodiments, assuming that the first read voltage Vr1 is applied, when a memory cell is turned on, data '0' may be stored, and when the memory cell is turned off, data '1' may be stored. As such, a logic level of data may vary.

Figure 11:
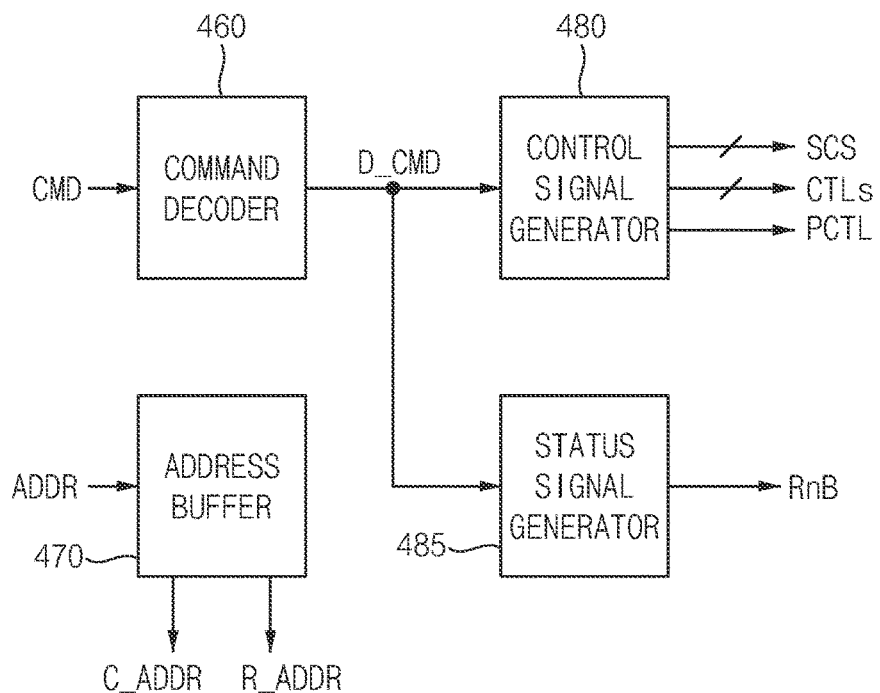
FIG. 11 is a block diagram illustrating the control circuit in the nonvolatile memory device of FIG. 2 according to example embodiments.

FIG. 11 is a block diagram illustrating the control circuit in the nonvolatile memory device of FIG. 2 according to example embodiments.

Referring to FIG. 11, the control circuit 450 may include a command decoder 460, an address buffer 470, a control signal generator 480 and a status signal generator 485.

The command decoder 460 may decode the command CMD and provide a decoded command D_CMD to the control signal generator 480 and the status signal generator 485.

The address buffer 470 may receive the address signal ADDR, provide the row address R_ADDR to the first address decoder 300a and the second address decoder 300b and provide the column address C_ADDR to the data I/O circuit 420.

The control signal generator 480 may receive the decoded command D_CMD, may generate the control signals CTLs based on an operation directed by the decoded command D_CMD and provide the control signals CTLs to the voltage generator 500. The control signal generator 480 may generate the page buffer control signal PCTL based on an operation directed by the decoded command D_CMD to provide the page buffer control signal PCTL to the page buffer circuit 410, and may generate the switching control signals SCS to provide the switching control signals SCS to the address decoder 300.

The status signal generator 485 may receive the decoded command D_CMD, may monitor an operation directed by the decoded command D_CMD and may control the status signal RnB to one of a ready state or a busy state based on whether the operation directed by the decoded command D_CMD is completed.

Figure 12:
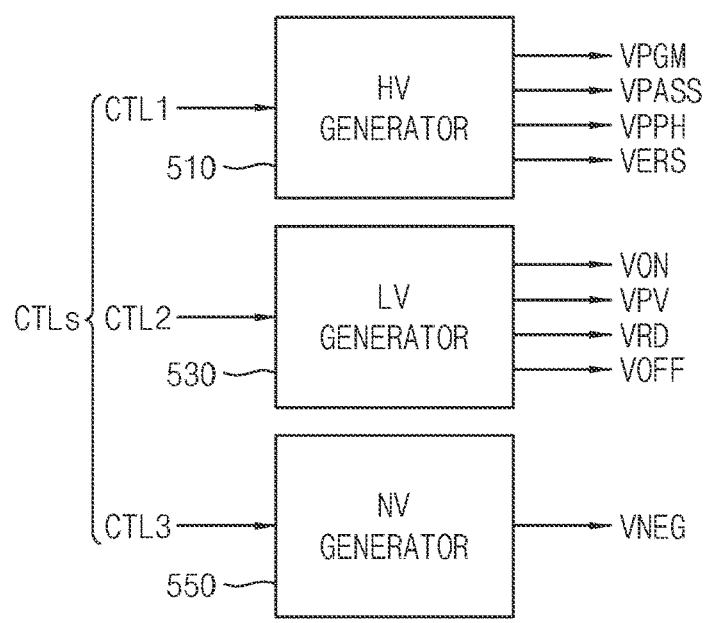
FIG. 12 is a block diagram illustrating the voltage generator in the nonvolatile memory device of FIG. 2 according to example embodiments.

FIG. 12 is a block diagram illustrating the voltage generator in the nonvolatile memory device of FIG. 2 according to example embodiments.

Referring to FIG. 12, the voltage generator 500 may include a high voltage (HV) generator 510 and a low voltage (LV) generator 530. The voltage generator 500 may further include a negative voltage (NV) generator 550.

The high voltage generator 510 may generate a program voltage PGM, a pass voltage VPASS, a high voltage VPPH and an erase voltage VERS according to operations directed by the command CMD, in response to a first control signal CTL1.

The program voltage PGM is applied to the selected word-line, the pass voltage VPASS may be applied to the unselected word-lines, the erase voltage VERS may be applied to the well of the memory block or each drain of pass transistors coupled to a bit-line and a common source line. The high voltage VPPH may be applied to each gate of pass transistors coupled to word-lines, a string selection line and a ground selection line. The first control signal CTL1 may include a plurality of bits which indicate the operations directed by the decoded command D_CMD.

The low voltage generator 530 may generate a program verification voltage VPV, a read voltage VRD, a turn-on voltage VON and a turn-off voltage VOFF according to operations directed by the command CMD, in response to a second control signal CTL2. The program verification voltage VPV and the read voltage VRD may be applied to the selected word-line according to operation of the memory cell array 200. The turn-on voltage VON and the turn-off voltage VOFF may be applied to the string selection line and the ground selection line to control turning on and turning off of the string selection transistor and the ground selection transistor. The second control signal CTL2 may include a plurality of bits which indicate the operations directed by the decode command D_CMD.

The negative voltage generator 550 may generate a negative voltage VNEG which has a negative level according to operations directed by the command CMD, in response to a third control signal CTL3. The third control signal CTL3 may include a plurality of bits which indicate the operations directed by the decoded command D_CMD. The negative voltage VNEG may be applied to a selected word-line and unselected word-lines during a program recovery period and may be applied to the unselected word-lines during a bit-line set-up period.

Figure 13:
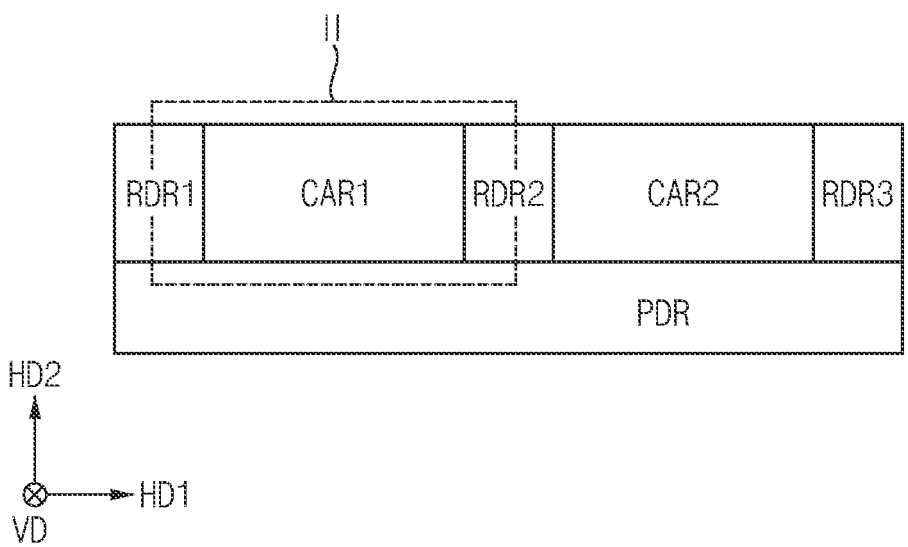
FIG. 13 is an example layout diagram illustrating a nonvolatile memory device according to example embodiments.

FIG. 13 is an example layout diagram illustrating a nonvolatile memory device according to example embodiments.

Referring to FIG. 13, the nonvolatile memory device 100 may include a first row decoder region RDR1, a first cell array region CARL, a second row decoder region RDR2, a second cell array region CAR2 and a third row decoder region RDR3 which are disposed consecutively in the first direction HD1.

The nonvolatile memory device 100 may further include a pad region PDR adjacent, in the second direction HD2, to the first row decoder region RDR1, the first cell array region CARL, the second row decoder region RDR2, the second cell array region CAR2 and the third row decoder region RDR3.

The first row decoder region RDR1, the first cell array region CAR1, the second row decoder region RDR2, the second cell array region CAR2 and the third row decoder region RDR3 may extend in the second direction HD2 and the pad region PDR may extend in the first direction HD1.

One or more memory blocks including a plurality of nonvolatile memory cells, a through-hole via region and one or more dummy blocks separating the through-hole via region from the one or more memory blocks may be provided in each of the first cell array region CAR1 and the second cell array region CAR2.

A first type (a high voltage type) of address decoder may be disposed in the first row decoder region RDR1 and the first type of address decoder may drive at least one selection line, a plurality of word-lines and at least one ground selection line of the first cell array region CAR1.

A second type (a low voltage type) of address decoder may be disposed in the second row decoder region RDR2 and the second type of address decoder may drive at least one selection line and at least one ground selection line of each of the first cell array region CAR1 and the second cell array region CAR2.

Another first type of address decoder may be disposed in the third row decoder region RDR3 and the first type of address decoder may drive at least one selection line, a plurality of word-lines and at least one ground selection line of the second cell array region CAR2.

Power pads including a power supply voltage pad and a ground voltage pad, and data pads may be disposed in the pad region PDR.

A portion II of the nonvolatile memory device 100 will be described with reference to FIG. 17.

Figure 14:
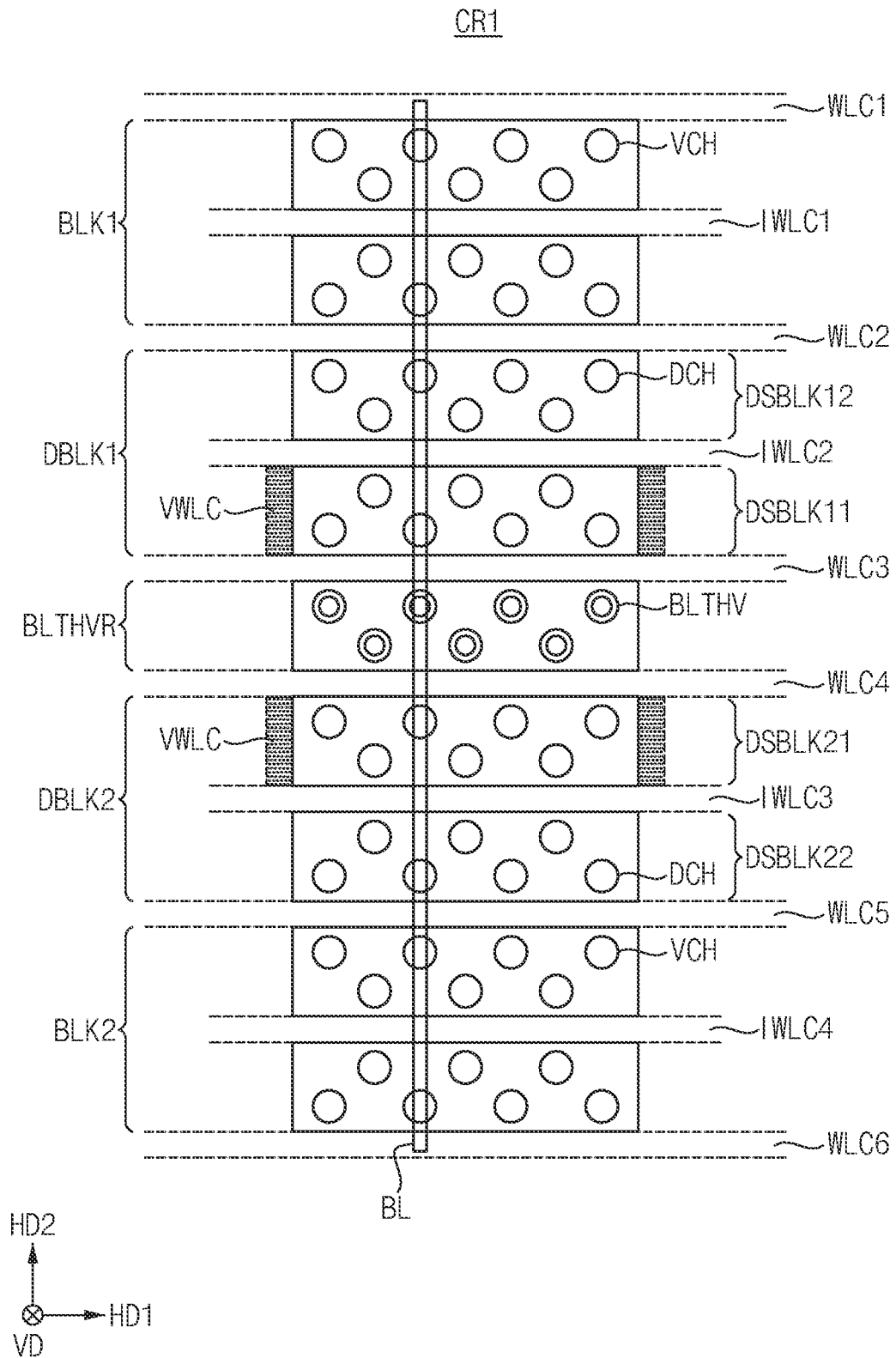
FIG. 14 is a plan view illustrating a first cell region CR1 in the nonvolatile memory device of FIG. 13 according to example embodiments.

FIG. 14 is a plan view illustrating a first cell region CR1 in the nonvolatile memory device of FIG. 13 according to example embodiments. The first cell region CR1 may be provided in the first cell array region CARL or the second cell array region CAR2. For example, a plurality of cell regions may be provided in each of the first cell array region CARL and the second cell array region CAR2.

Referring to FIG. 14, the first cell region CR1 may include one or more memory blocks BLK1 and BLK2 extending in the first direction HD1 and being spaced apart from each other in the second direction HD2, a through-hole via region BLTHVR in which bit-line through-hole vias BLTHV are provided, and one or more dummy blocks DBLK1 and DBLK2 that separate the one or more memory blocks BLK1 and BLK2 from the through-hole via region BLTHVR.

The one or more memory blocks BLK1 and BLK2, the through-hole via region BLTHVR and the one or more dummy blocks DBLK1 and DBLK2 are separated from each other by word-line cut regions WLC1, WLC2, WLC3, WLC4, WLC5 and WLC6 extending in the first direction HD1.

A first memory block BLK1 may be defined by the word-line cut regions WLC1 and WLC2, and may be divided into two sub-blocks by an internal word-line cut region IWLC1 extending in the first direction HD1. A second memory block BLK2 may be defined by the word-line cut regions WLC5 and WLC5, and may be divided into two sub-blocks by an internal word-line cut region IWLC4 extending in the first direction HD1.

The dummy block DBLK1 (a first dummy block) may be defined by the word-line cut regions WLC2 and WLC3, and may be divided into a first dummy sub-block DSBLK11 and a second dummy sub-block DSBLK12 by an internal word-line cut region IWLC2 extending in the first direction HD1. That is, the control circuit 450 in FIG. 2 may divide the dummy block DBLK1 into the first dummy sub-block DSBLK11 and the second dummy sub-block DSBLK12 based on a relative distance from the through-hole via region BLTHVR in the second direction HD2.

The through-hole via region BLTHVR may be defined by the word-line cut regions WLC3 and WLC4. A plurality of bit-line through-hole vias BLTHV for connecting the bit-lines BLs and the page buffer circuit 410 in FIG. 2 may be provided in the through-hole via region BLTHVR.

The dummy block DBLK2 (a second dummy block) may be defined by the word-line cut regions WLC4 and WLC5, and may be divided into a third dummy sub-block DSBLK21 and a fourth dummy sub-block DSBLK22 by an internal word-line cut region IWLC3 extending in the first direction HD1. That is, the control circuit 450 in FIG. 2 may divide the dummy block DBLK2 into the third dummy sub-block DSBLK21 and the fourth dummy sub-block DSBLK22 based on a relative distance from the through-hole via region BLTHVR in the second direction HD2.

A plurality of vertical channel structures VCH which extend in the third direction VD may be provided in the first memory block BLK1 and the second memory block BLK2, and a plurality of dummy channel structures DCH which extend in the third direction VD may be provided in the first dummy block DBLK1 and the second dummy block DBLK2. The plurality of vertical channel structures VCH may correspond to memory cells and the plurality of dummy channel structures DCH may correspond to dummy memory cells. The bit-line BL extending in the second direction HD2 may be connected to the vertical channel structures VCH, the dummy channel structures DCH and the bit-line through-hole via BLTHV.

Because the first dummy sub-block DSBLK11 and the third dummy sub-block DSBLK21 directly contact the through-hole via region BLTHVR, each of the first dummy sub-block DSBLK11 and the third dummy sub-block DSBLK21 may be referred to as an adjacent sub-block. Because the second dummy sub-block DSBLK12 and the fourth dummy sub-block DSBLK22 do not directly contact the through-hole via region BLTHVR, each of the second dummy sub-block DSBLK12 and the fourth dummy sub-block DSBLK22 may be referred to as a non-adjacent sub-block. The first dummy sub-block DSBLK11 and the third dummy sub-block DSBLK21 may be isolated from the plurality of word-lines by vertical word-line cut regions VWLC extending in the second direction HD2.

The control circuit 450 may use each of the non-adjacent sub-blocks (i.e., the second dummy sub-block DSBLK12 and the fourth dummy sub-block DSBLK22) as a sub-block to store data, and may thereby increase a capacity of memory blocks for storing data in the nonvolatile memory device 100.

Figure 15:
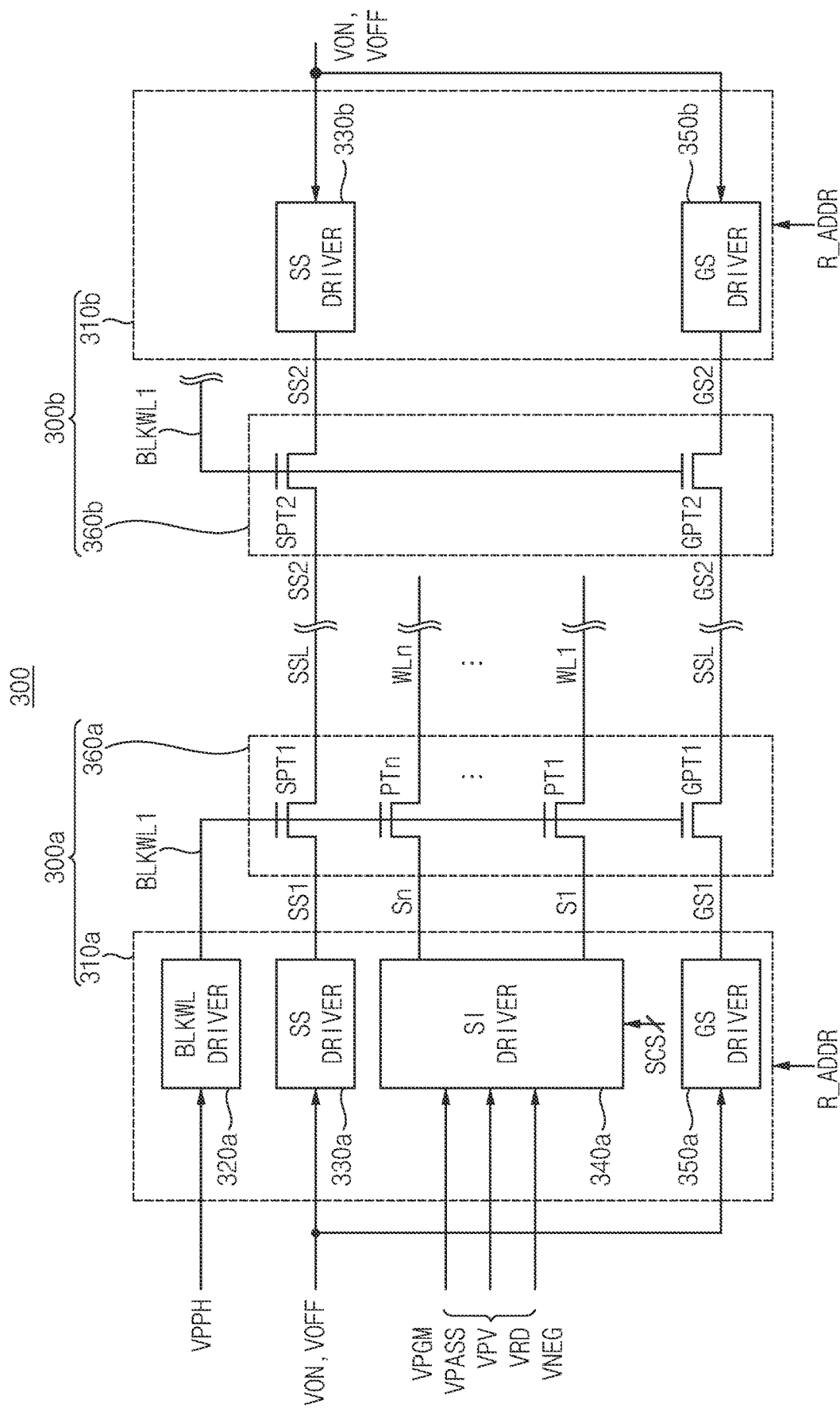
FIG. 15 is a block diagram illustrating an example of the first address decoder and the second address decoder in the nonvolatile memory device of FIG. 2 according to example embodiments.

FIG. 15 is a block diagram illustrating an example of the first address decoder and the second address decoder in the nonvolatile memory device of FIG. 2 according to example embodiments.

Referring to FIG. 15, the first address decoder 300a may include a first driver circuit 310a and a first pass switch circuit 360a, and the second address decoder 300b may include a second driver circuit 310b and a second pass switch circuit 360b. The first address decoder 300a may be referred to as a first row decoder and the second address decoder 300b may be referred to as a second row decoder.

The first driver circuit 310a may transfer voltages provided from the voltage generator 500 to the memory cell array 200 according to a block address. The first driver circuit 310a may include a block selection driver BWLWL DRIVER 320a, a first string selection driver SS DRIVER 330a, a word-line driver SI DRIVER 340a and a first ground selection driver GS DRIVER 350a.

The second driver circuit 310b may transfer a portion of the voltages provided from the voltage generator 500 to the memory cell array 200 in response to the block address. The second driver circuit 310ba may include a second string selection driver SS DRIVER 330b and a second ground selection driver GS DRIVER 350b.

The block selection driver 320a may supply the high voltage VPPH from the voltage generator 500 to the first pass transistor circuit 360a and the second pass transistor circuit 360b in response to the block address. The block selection driver 320a may supply the high voltage VPPH to a block word-line BLKWL1 coupled to gates of a plurality of first pass transistors GPT1, PT1~PTn and SPT1 in the first pass transistor circuit 360a and coupled to gates of a plurality of second pass transistors GPT2 and SPT2 in the second pass transistor circuit 360b. The block selection driver 320a may control the application of various voltages, such as a pass voltage, a program voltage, a read voltage, to the memory cell array 200.

The first pass transistors GPT1, PT1~PTn and SPT1 may include a first ground pass transistor GPT1, a plurality of word-line pass transistors PT1~PTn and a first string pass transistor SPT1. The second pass transistors GPT2 and SPT2 may include a second ground pass transistor GPT2 and a second string pass transistor SPT2.

The first string selection driver 330a may supply the turn-on voltage VON and the turn-off voltage VOFF from the voltage generator 500 to the string selection line SSL through the first string pass transistor SPT1 as a string selection signal SS1. The second string selection driver 330b may supply the turn-on voltage VON and the turn-off voltage VOFF from the voltage generator 500 to the string selection line SSL through the second string pass transistor SPT2 as a string selection signal SS2. During a program operation, the first string selection driver 330a and the second string selection driver 330b may supply the selection signals SS1 and SS2 so as to turn on all string selection transistors in a selected memory block.

The driving line driver 340a may supply the program voltage VPGM, the pass voltage VPASS, the verification voltage VPV, the read voltage VRD, and the negative voltage VNEG from the voltage generator 500 to word-lines WL1~WEn through driving lines S1~Sn and the word-line pass transistors PT1~PTn.

The first ground selection driver 350a may supply the turn-on voltage VON and the turn-off voltage VOFF from the voltage generator 500 to the ground selection line GSL through the first ground pass transistor GPT1 as a ground selection signal GS1. The second ground selection driver 350b may supply the turn-on voltage VON and the turn-off voltage VOFF from the voltage generator 500 to the ground selection line GSL through the second ground pass transistor GPT2 as a ground selection signal GS2.

The first pass transistors GPT1, PT1~PTn and SPT1, and the second pass transistors GPT2 and SPT2 are configured such that the ground selection line GSL, the word-lines WL1~WLn and the string selection line SSL are electrically connected to corresponding driving lines, in response to activation of the high voltage VPPH on the block word-line BLKWL1. In example embodiments, each of the first pass transistors GPT1, PT1~PTn and SPT1, and the second pass transistors GPT2 and SPT2 may include a high voltage transistor capable of enduring high-voltage.

The first pass transistors GPT1, PT1~PTn and SPT1 may be connected to the block word-line BLKWL1 by upper conductive lines and lower conductive lines of the nonvolatile memory device 100. The second pass transistors GPT2 and SPT2 may be connected to the block word-line BLKWL1 by the lower conductive lines of the nonvolatile memory device 100. Therefore, upper conductive lines above the second address decoder 300b may be eliminated and thus, freedom of wiring at a portion of the second address decoder 300b may increase.

Figure 16:
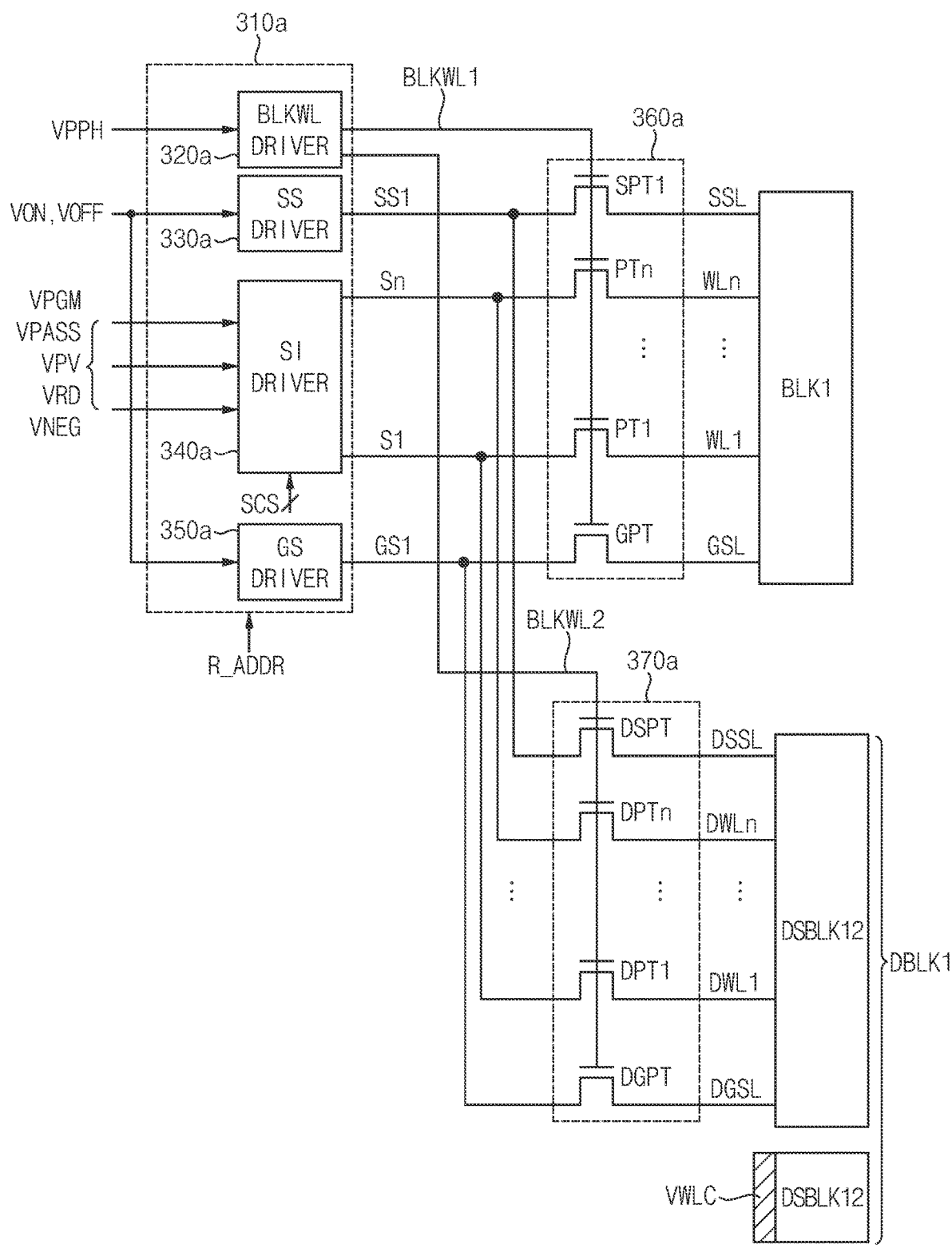
FIG. 16 illustrates an example connection of the first address decoder in FIG. 15, the memory block and the dummy block according to example embodiments.

FIG. 16 illustrates an example connection of the first address decoder in FIG. 15, the memory block and the dummy block according to example embodiments.

Referring to FIG. 16, the first address decoder 300a may include a first driver circuit 310a, a first pass switch circuit 360a and a dummy pass switch circuit 370a.

Description on configuration and operation of the first driver circuit 310a and the first pass switch circuit 360a is repeated with FIG. 15 and will be omitted.

The dummy pass switch circuit 370a may include dummy pass transistors DGPT, DPT1~DPTn and SGPT connected to a dummy ground selection line DGSL, dummy word-lines DWL1~DWLn and a dummy string selection line DSSL of the second dummy sub-block DSBLK12 in the first dummy block DBLK1, respectively, and the block selection driver 320a may supply the high voltage VPPH from the voltage generator 500 to a gate of each of the dummy pass transistors DGPT, DPT1~DPTn and SGPT.

The first string selection driver 330a may supply the turn-on voltage VON and the turn-off voltage VOFF from the voltage generator 500 to the dummy string selection line GSSL through the dummy pass transistor DSPT as the string selection signal SS1.

The driving line driver 340a may supply the program voltage VPGM, the pass voltage VPASS, the verification voltage VPV, the read voltage VRD, and the negative voltage VNEG from the voltage generator 500 to the dummy word-lines DWL1~DWLn through driving lines S1~Sn and the dummy pass transistors DPT1~DPTn.

The first ground selection driver 350a may supply the turn-on voltage VON and the turn-off voltage VOFF from the voltage generator 500 to the dummy ground selection line DGSL through the dummy pass transistor DGPT as the ground selection signal GS1.

The first dummy sub-block DSBLK11 may be isolated from the dummy ground selection line DGSL, the dummy word-lines DWL1~DWLn and the dummy string selection line DSSL by the vertical word-line cut region VWLC.

Figure 17:
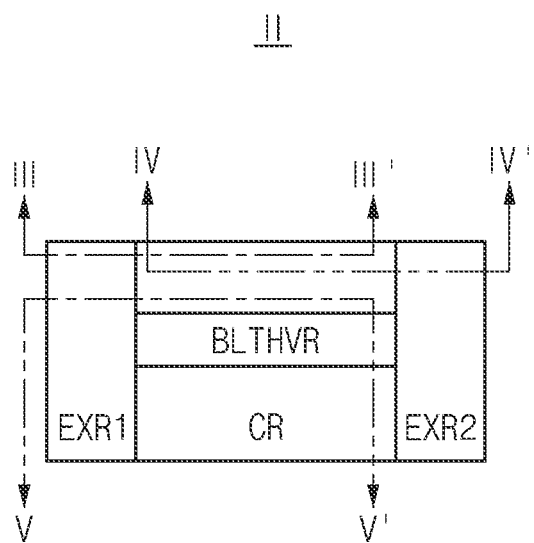
FIG. 17 illustrates a portion in the nonvolatile memory device of FIG. 13 in detail according to example embodiments.

FIG. 17 illustrates a portion in the nonvolatile memory device of FIG. 13 in detail according to example embodiments.

Referring to FIG. 17, the portion II may include a cell region (or, a cell array region) CR, a first extension region EXR1 disposed adjacently to a first side of the cell region CR and a second extension region EXR2 disposed adjacently to a second side of the cell array region CR. The second side of the cell region CR may be opposed to the first side of the cell region CR.

A plurality of memory cells, a plurality of word-lines, at least one string selection line, at least one ground selection line, a plurality of bits-lines and the through-hole via region BLTHVR may be provided in the cell region CR, and a plurality of first connection elements may be provided in the first extension region EXR1. The plurality of first connection elements may electrically connect the first address decoder 300a to the plurality of word-lines, the at least one string selection line and the at least one ground selection line. A plurality of second connection elements may be provided in the second extension region EXR2. The plurality of second connection elements may electrically connect the second address decoder 300b to the at least one string selection line and the at least one ground selection line.

Figure 18:
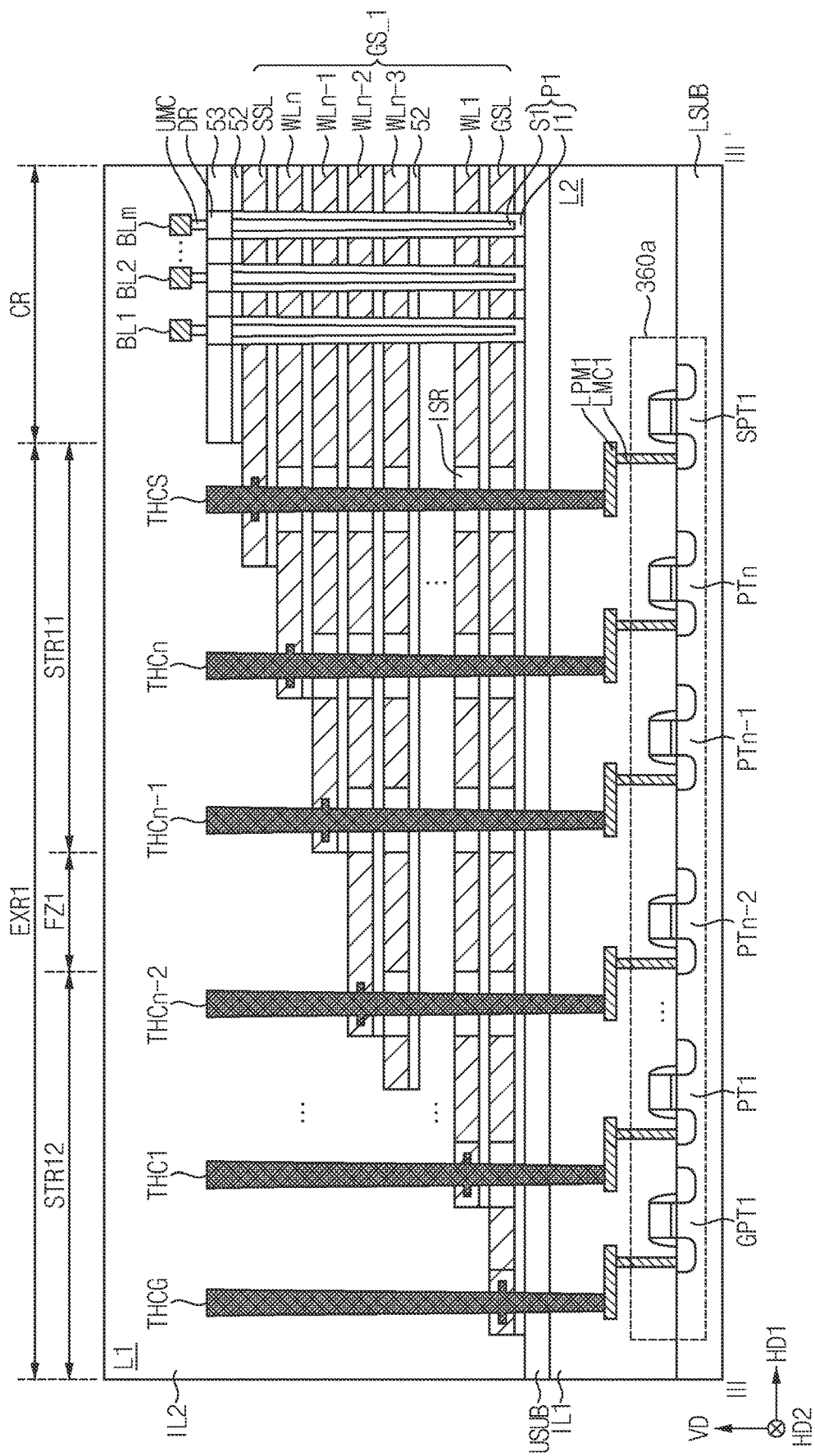
FIG. 18 is a cross-sectional view of an example of the portion taken along a line III-III' in the portion of FIG. 17.
Figure 19:
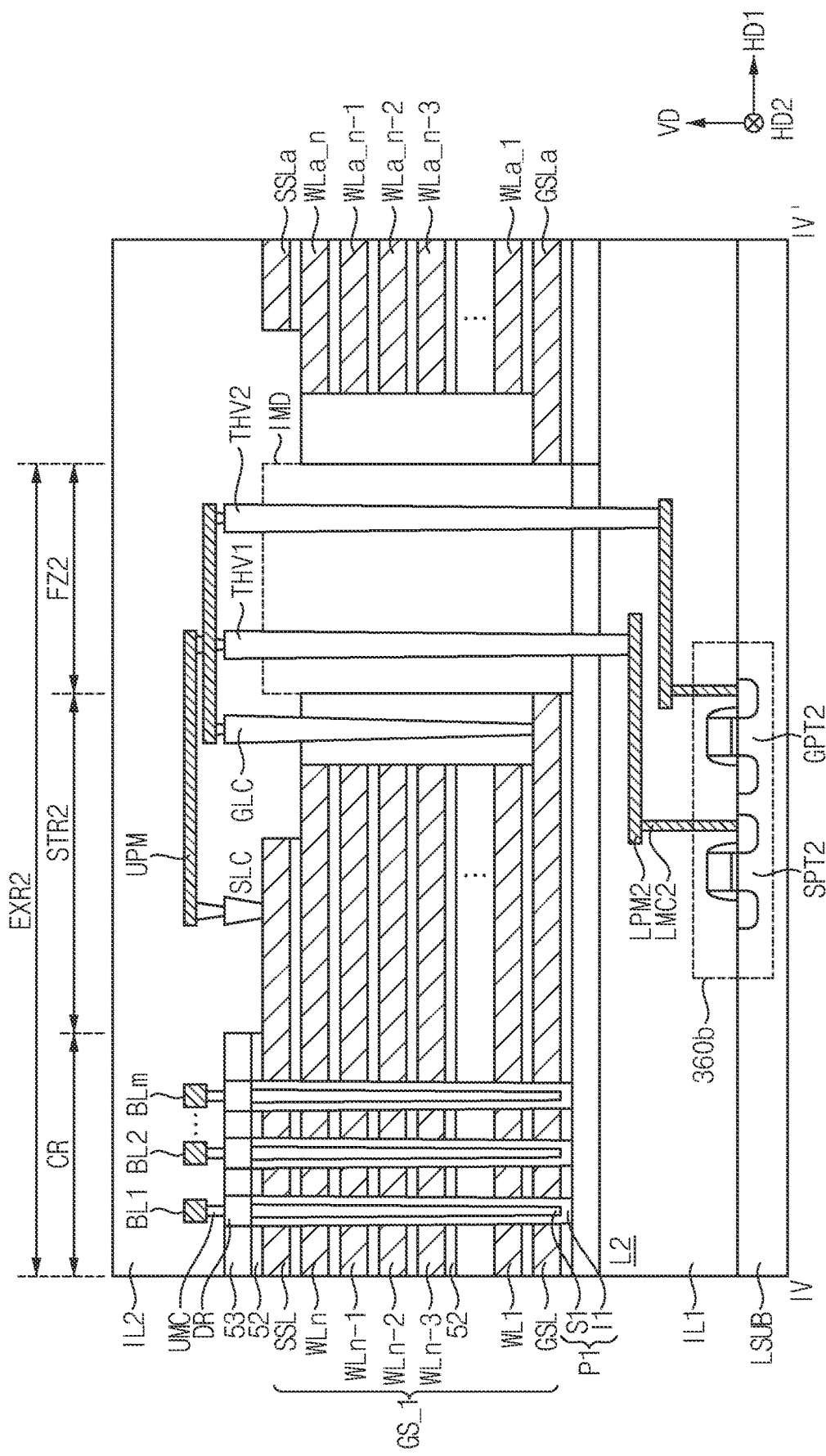
FIG. 19 is a cross-sectional view of an example of the portion taken along a line IV-IV' in the portion of FIG. 17.
Figure 20:
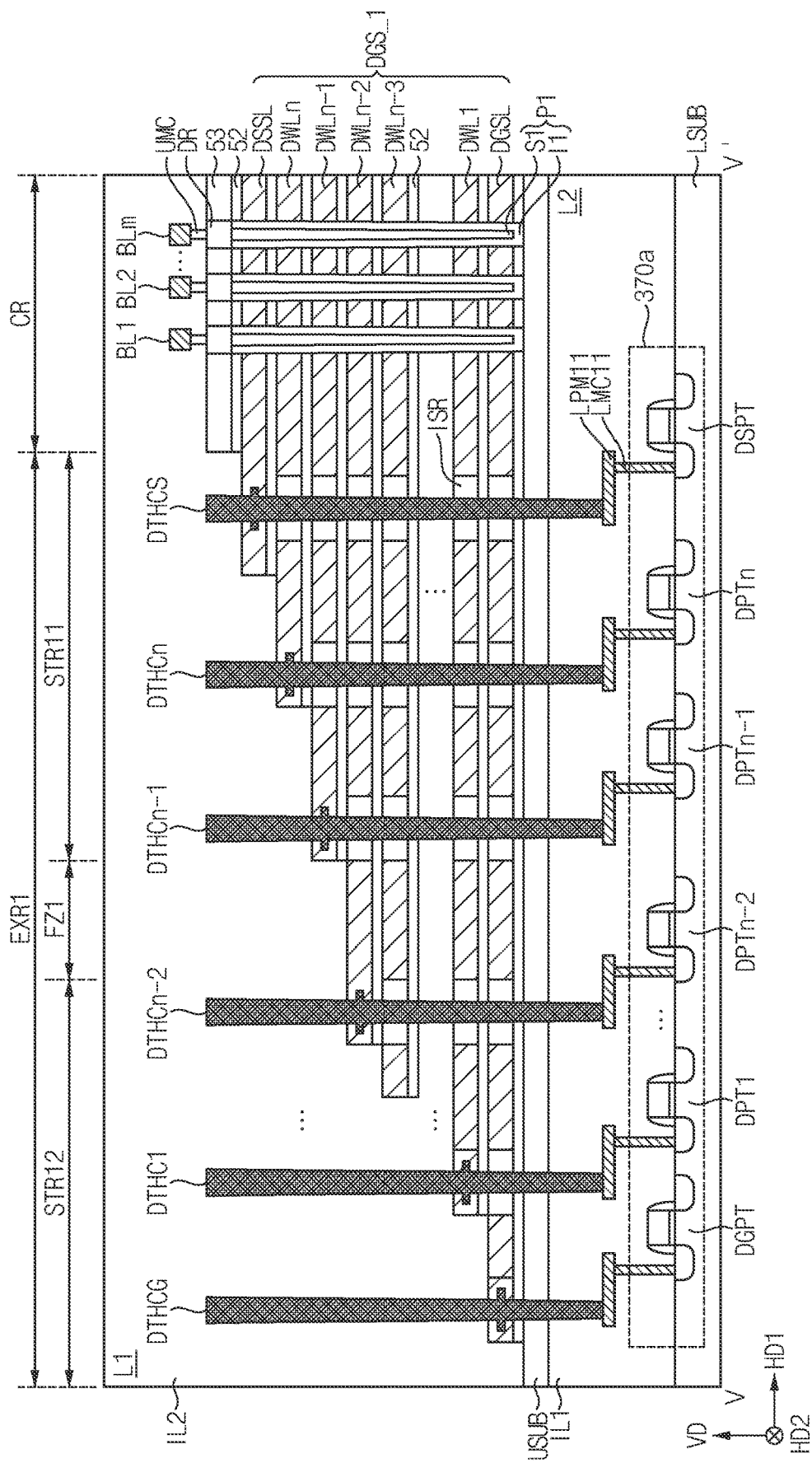
FIG. 20 is a cross-sectional view of an example of the portion taken along a line V-V' in the portion of FIG. 17.

FIG. 18 is a cross-sectional view of an example of the portion taken along a line III-III' in the portion of FIG. 17, FIG. 19 is a cross-sectional view of an example of the portion taken along a line IV-IV' in the portion of FIG. 17 and FIG. 20 is a cross-sectional view of an example of the portion taken along a line V-V' in the portion of FIG. 17.

Referring to FIGS. 17, 18 and 19, the second semiconductor layer L2 may include a lower substrate LSUB, the first pass switch circuit 360a and the second pass switch circuit 360b. The first pass switch circuit 360a and the second pass switch circuit 360b may be provided (or formed) in the lower substrate LSUB.

In addition, the second semiconductor layer L2 may include lower contacts LMC1 electrically connected to the first address decoder 300a, lower conductive lines LPM1 electrically connected to the lower contacts LMC1, lower contacts LMC2 electrically connected to the second address decoder 300b, lower conductive lines LPM2 electrically connected to the lower contacts LMC2 and a lower insulating layer IL1 covering the lower contacts LMC1 and LMC2 and the lower conductive lines LPM1 and LPM2.

The first pass switch circuit 360a may be provided (or formed) in a first portion of the lower substrate LSUB. The first pass switch circuit 360a may be provided by forming a plurality of first pass transistors including the first ground pass transistor GPT1, the plurality of word-line pass transistors PT1~PTn and the first string pass transistor SPT1 in the first portion of the lower substrate LSUB.

The second pass switch circuit 360b may be provided (or formed) in a second portion of the lower substrate LSUB. The second pass switch circuit 360b may be provided by forming a plurality of second pass transistors including the second ground pass transistor GPT2 and the second string pass transistor SPT1 in the second portion of the lower substrate LSUB.

The first semiconductor layer L1 may include the cell region CR, the first extension region EXR1 and the second extension region EXR2. The first extension region EXR1 may be formed adjacent to the first side of the cell region CR in the second direction HD2. The second extension region EXR2 may be formed adjacent to the second side of the cell array region CR, opposed to the first side of the cell array region CR, in the second direction HD2. The first extension region EXR1 may include a first step zone (or a stair region) STR11, a second step zone STR12 and a first flat zone FZ1 between the first step zone STR11 and the second step zone STR12. The second extension region EXR1 may include a third step zone STR2 and a second flat zone FZ2 and the second flat zone FZ2 may include an insulating mold structure IMD. The first step zone STR11 may have a stepped shape that descends from the first side of the cell region CR and the second step zone STR12 may have a stepped shape that descends from a periphery of the first flat zone FZ1. The third step zone STR2 may have a stepped shape that descends from the second side of the cell region CR.

The first semiconductor layer L1 may include an upper substrate USUB, a vertical structure VS and the insulating mold structure IMD.

In addition, the first semiconductor layer L1 may include upper contacts UMC, bit-lines BL1 through BLm, a string selection line contact SLC, a ground selection line contact GLC and upper conductive lines UPM that are electrically connected to a vertical structure.

Additionally, the first semiconductor layer L1 may include the through-hole vias THV1 and THV2 formed in the insulating mold structure IMD2 and electrically connected to string selection line contact SLC and the ground selection line contact GLC. The first semiconductor layer L1 may further include an upper insulating layer IL2 covering the vertical structure the insulating mold structure IMD2 and various conductive lines.

The upper substrate USUB may be a support layer that supports a gate conductive layer GS_1. For example, the upper substrate USUB may be referred to as a base substrate.

The vertical structure may include the gate conductive layer GS_1 located on the upper substrate USUB, and pillars P1 that penetrate or pass through the gate conductive layer GS_1 and extend in the third direction VD on a top surface of the upper substrate USUB. The gate conductive layer GS_1 may include the ground selection line GSL, the plurality of word-lines WL1~WLn and the string selection line SSL. The ground selection line GSL, the plurality of word-lines WL1~WLn and the string selection line SSL may be sequentially formed on the upper substrate USUB, and insulating interlayers 52 may be located under or over each of the gate conductive layer GS_1. In this regard, the conductive layers (e.g., the ground selection line GSL, the word-lines WL1~WLn, and the string selection line SSL) including a conductive material and the insulating interlayers 52 including an insulating material may be alternately stacked in the third direction VD. The vertical structure VS may correspond to the cell region CR, the first extension region EXR1 and the second extension region EXR2.

Each of the pillars P1 may include a surface layer S1 and inside IL For example, the surface layer S1 of the pillars P1 may include a silicon material doped with an impurity, or a silicon material not doped with an impurity.

For example, the ground selection line GSL and a portion of the surface layer S1 adjacent to the ground selection line GSL may form ground selection transistors (e.g., the ground selection transistor GST in FIG. 5). In addition, the word-lines WL1~WLn and a portion of the surface layer S1 adjacent to the word-lines WL1~WLn may form memory cells (e.g., the memory cells MC1 to MC8 in FIG. 5). Further, the string selection line SSL and a portion of the surface layer S1 adjacent to the string selection line SSL may form a string selection transistor (e.g., the string selection transistor SST in FIG. 5).

Drain regions DR may be formed on the pillars P1. The drain regions DR may be electrically connected to the bit-lines BL0~BLm by the upper contacts UMC. For example, the drain regions DR may include a silicon material doped with an impurity. An etch-stop layer 53 may be formed on a side wall of the drain regions DR. A top surface of the etch-stop layer 53 may be formed on the same level as a top surface of the drain regions DR.

As illustrated in FIG. 18, a cross-section of a portion disposed in the first extension region EXR1 among the vertical structures may form a stepped shape. The stepped shape (or stepped pad shape) may be referred to as a "word-line pad." In addition, a flat zone may exist in the middle of the stepped shape.

The first semiconductor layer L1 may include a plurality of through-hole contacts THCG, THC1~THCn and THCS penetrating the first step zone STR11 and the second step zone STR12, and electrically connecting each of the ground selection line GSL, the plurality of word-lines WL1~WLn and the string selection line SSL to respective one of the first ground pass transistor GPT1, the word-line pass transistors PT1~PTn and the first selection pass transistor SPT1. The plurality of through-hole contacts THCG, THC1~THCn and THCS may be formed by avoiding the first flat zone FZ1.

Because each of the plurality of through-hole contacts THCG, THC1~THCn and THCS is directly connected to respective one of the ground selection line GSL, the plurality of word-lines WL1~WLn and the string selection line SSL by penetrating conductive lines in the first step zone STR11 and the second step zone STR12 and the insulating interlayers 52, the upper contacts UMC and the upper conductive lines UPM above the first extension region EXR1 may be eliminated or may be used for connecting other elements.

Each of the plurality of through-hole contacts THCG, THC1~THCn and THCS may be connected to a target line by penetrating an insulating region ISR of lower lines.

Referring to FIG. 19, the insulating mold structure IMD may include an insulating material that is filled in on the upper substrate USUB in the third direction VD. The through-hole vias THV1 and THV2 may be formed in the second flat zone FZ2 and may be formed by penetrating the insulating mold structure IMD. Thus, there may be no need to further form an insulating material surrounding the through-hole vias THV1 and THV2, which is advantageous in the manufacturing process.

In FIG. 19, a ground selection line GSLa, a plurality of word-lines WLa_1~Wla_n and a string selection line SSLa may represent another cell region adjacent to the insulating mold structure IMD.

In FIG. 18, each gate of the first ground pass transistor GPT1, the word-line pass transistors SPT1~SPTn and the first selection pass transistor SPT1 may be connected to the block word-line BLKWL1 by using lower conductive lines (lower wires) in the second semiconductor layer L2 and upper conductive lines (upper wires) in the first semiconductor layer L1.

In addition, in FIG. 19, each gate of the second ground pass transistor GPT2 and the second selection pass transistor SPT2 may be connected to the block word-line BLKWL1 by using lower conductive lines (lower wires) in the second semiconductor layer L2.

Referring to FIGS. 18 and 20, the second semiconductor layer L2 may include the lower substrate LSUB and the dummy pass switch circuit 370a provided (or formed) in the lower substrate LSUB.

In addition, the second semiconductor layer L2 may include lower contacts LMC11 electrically connected to the dummy pass switch circuit 370a, lower conductive lines LPM11 electrically connected to the lower contacts LMC11 and a lower insulating layer IL1 covering the lower contacts LMC11 and LMC12.

The dummy pass switch circuit 370a may be provided (or formed) in a first portion of the lower substrate LSUB. The dummy pass switch circuit 370*a* may be provided by forming a plurality of pass transistors including the dummy pass transistors DGPT, DPT1~DPTn and DSPT in the lower substrate LSUB.

A vertical structure may include a gate conductive layer DGS_1 located on the upper substrate USUB, and pillars P1 that penetrate or pass through the gate conductive layer DGS_1 and extend in the third direction VD on a top surface of the upper substrate USUB. The gate conductive layer DGS_1 may include the dummy ground selection line DGSL, the plurality of dummy word-lines DWL1~DWLn and the dummy string selection line DSSL. The dummy ground selection line DGSL, the plurality of dummy word-lines DWL1~DWLn and the dummy string selection line DSSL may be sequentially formed on the upper substrate USUB, and insulating interlayers 52 may be located under or over each of the gate conductive layer DGS_1.

Each of the pillars P1 may include a surface layer S1 and inside I1. For example, the surface layer S1 of the pillars P1 may include a silicon material doped with an impurity, or a silicon material not doped with an impurity.

For example, the dummy ground selection line DGSL and a portion of the surface layer S1 adjacent to the dummy ground selection line DGSL may form a dummy ground selection transistor. In addition, the dummy word-lines DWL1~DWLn and a portion of the surface layer S1 adjacent to the dummy word-lines DWL1~DWLn may form dummy memory cells. Further, the dummy string selection line DSSL and a portion of the surface layer S1 adjacent to the dummy string selection line DSSL may form a dummy string selection transistor.

The first semiconductor layer L1 may include a plurality of through-hole contacts DTHCG, DTHC1~DTHCn and DTHCS penetrating the first step zone STR11 and the second step zone STR12 and electrically connecting each of the dummy ground selection line DGSL, the plurality of dummy word-lines DWL1~DWLn and the dummy string selection line DSSL to respective one of the dummy pass transistor DGPT1, the dummy pass transistors SPT1~DPTn and the dummy pass transistor DSPT. The plurality of through-hole contacts DTHCG, DTHC1~DTHCn and DTHCS may be formed by avoiding the first flat zone FZ1.

Figure 21:
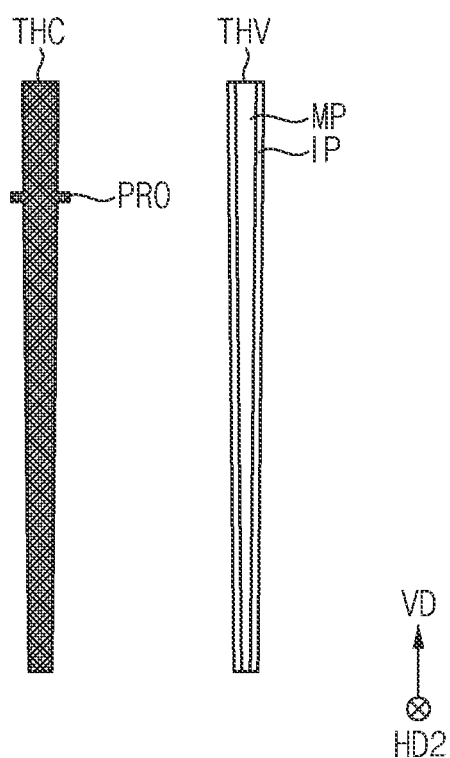
FIG. 21 illustrates an example of a through-hole contact and a through-hole via in FIGS. 18 and 19.

FIG. 21 illustrates an example of a through-hole contact and a through-hole via, and may correspond to those shown in FIGS. 18 and 19.

Referring to FIG. 21, a through-hole contact THC and a through-hole via THV may have the same height in the third direction VD, and the through-hole contact THC may have a protruding portion PRO that protrudes in the target line. The through-hole via THV may include an insulating layer pattern IP and a conductive pattern MP.

The through-hole contact THC may be formed by merging a through-hole via and a word-line contact, and thus, a size of the through-hole contact THC may be greater than a size of the string selection line contact SLC and a size of the ground selection line contact GLC in FIG. 19. That is, the through-hole contact THC may have a merged type of a through-hole via and a word-line contact.

Figure 22:
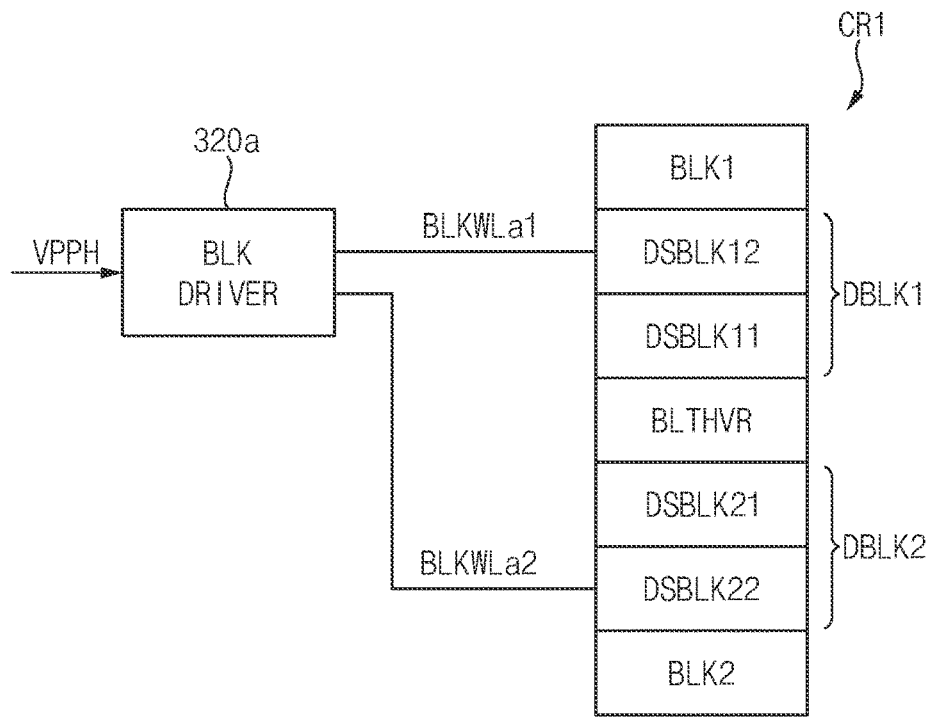
FIGS. 22, 23 and 24 illustrate examples of connection relationships between the block selection driver in the first address decoder in FIG. 16 and the first cell region, respectively.
Figure 23:
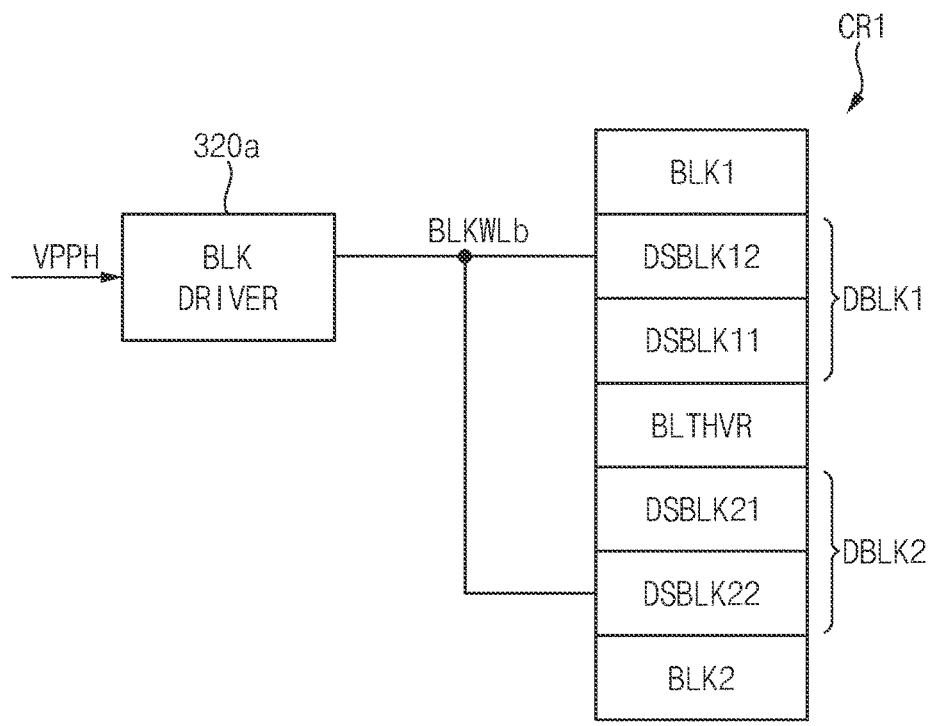
Figure 24:
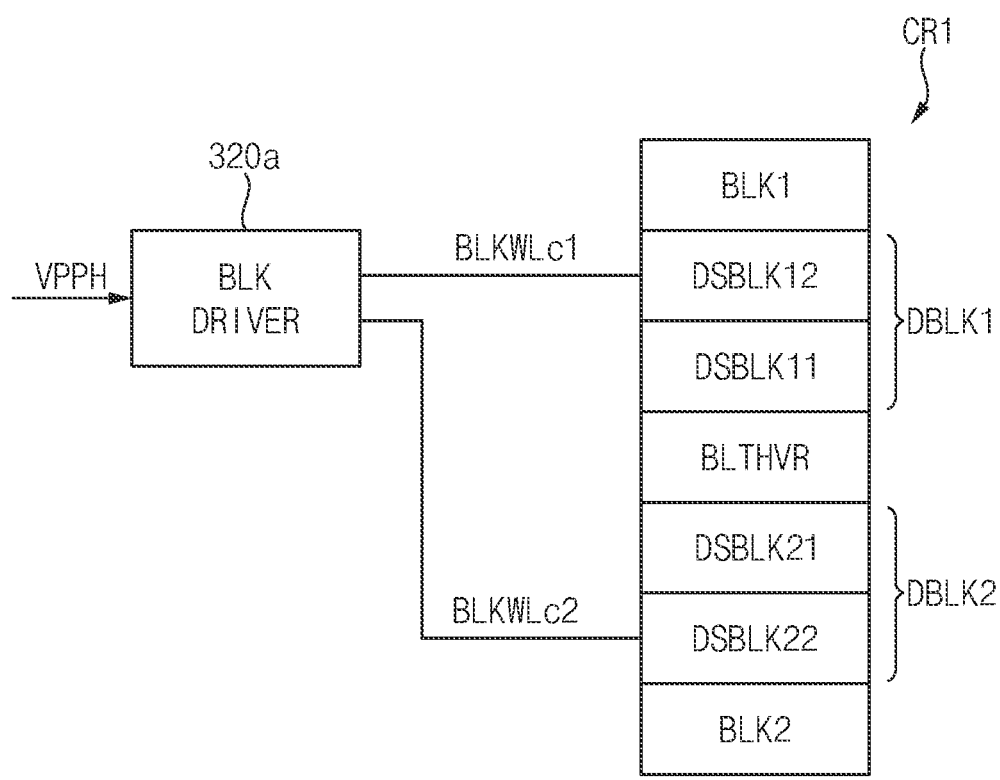

FIGS. 22, 23 and 24 illustrate examples of connection relationships between the block selection driver in the first address decoder in FIG. 16 and the first cell region, respectively.

In FIGS. 22, 23 and 24, the word-line cut regions WLC1, WLC2, WLC3, WLC4, WLC5 and WLC6, the internal word-line cut regions IWLC1, IWLC2, IWLC3 and IWLC4 and the vertical word-line cut regions VWLC in the first cell region CR1 of FIG. 14 are not illustrated for convenience of explanation.

Referring to FIG. 22, the block selection driver 320*a* may be connected to the second dummy sub-block DSBLK12 through a first block word-line BLKWLa1 and may be connected to the fourth dummy sub-block DSBLK22 through a second block word-line BLKWLa2.

The control circuit 420 in FIG. 2 may use each of the second dummy sub-block DSBLK12 and the fourth dummy sub-block DSBLK22 as an individual sub-block to store data and the data may correspond to a single level data.

Referring to FIG. 23, the block selection driver 320*a* may be connected to the second dummy sub-block DSBLK12 and the fourth dummy sub-block DSBLK22 through one block word-line BLKWLb.

The control circuit 420 in FIG. 2 may use the second dummy sub-block DSBLK12 and the fourth dummy sub-block DSBLK22 as one memory block to store data.

Referring to FIG. 24, the block selection driver 320*a* may be connected to the second dummy sub-block DSBLK12 through a first block word-line BLKWLc1 and may be connected to the fourth dummy sub-block DSBLK22 through a second block word-line BLKWLc2.

The control circuit 420 in FIG. 2 may repair at least one defective cells in the second dummy sub-block DSBLK12 by using dummy memory cells in the fourth dummy sub-block DSBLK22.

Figure 25:
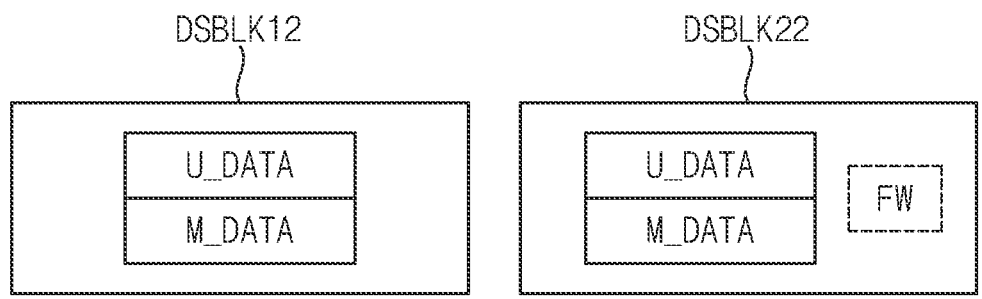
FIG. 25 illustrates examples of data to be stored in non-adjacent sub-blocks according to example embodiments.

FIG. 25 illustrates examples of data to be stored in non-adjacent sub-blocks according to example embodiments.

Referring to FIG. 25, the control circuit 450 in FIG. 2 may use the second dummy sub-block DSBLK12 and the fourth dummy sub-block DSBLK22 corresponding to non-adjacent sub-blocks as a power loss protector (PLP) memory block to store at least one of a metadata M_DATA and a user data U_DATA for data back-up in response to a sudden power off (SPO) event. The SPO event may arise because of various events including local area power loss, malfunction of power elements of the memory system 10, etc.

When the SPO event occurs, the control circuit 450 may write the metadata M_DATA and the user data U_DATA temporarily stored in a buffer memory coupled to the memory controller 50 in FIG. 1 to second dummy sub-block DSBLK12 and the fourth dummy sub-block DSBLK22 corresponding to PLP memory blocks, and when the power is normalized again, data may be read from the second dummy sub-block DSBLK12 and the fourth dummy sub-block DSBLK2 and restored in the buffer memory.

In example embodiments, the fourth dummy sub-block DSBLK22 may store firmware FW associated with operation of the nonvolatile memory device 100. The firmware FW may be loaded onto the memory controller 50 in FIG. 1.

Figure 26:
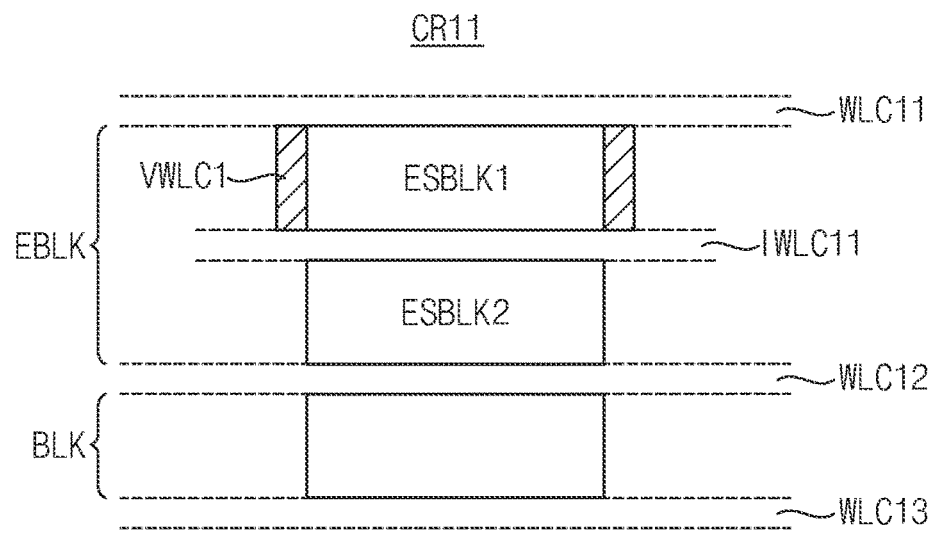
FIG. 26 is a plan view illustrating an example of a cell region according to example embodiments.
Figure 26:
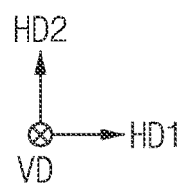

FIG. 26 is a plan view illustrating an example of a cell region according to example embodiments.

Referring to FIG. 26, a cell region CR11 may include an edge memory block EBLK and a memory block BLK extending in the first direction HD1 and being spaced apart from each other in the second direction HD2.

The edge memory block EBLK and a memory block BLK may be separated from each other by a word-line cut regions WLC11, WLC12 and WLC13 extending in the first direction HD1.

The edge memory block EBLK may be defined by the word-line cut regions WLC11 and WLC12, and may be divided into a first edge sub-block ESBLK1 and a second edge sub-block ESBLK2 by an internal word-line cut region IWLC11 extending in the first direction HD1. That is, the control circuit 450 in FIG. 2 may divide the edge memory block EBLK into first edge sub-block ESBLK1 and the second edge sub-block ESBLK2 based on a relative distance in the second direction HD2 from a first edge corresponding to the word-line cut region WLC11 in the first direction HD1.

Because the first edge sub-block ESBLK1 directly contacts the first edge, the first edge sub-block ESBLK1 may be referred to as an adjacent edge sub-block. Because the second edge sub-block ESBLK2 does not directly contact the first edge, the second edge sub-block ESBLK2 may be referred to as a non-adjacent edge sub-block. The first edge sub-block ESBLK1 may be isolated from the plurality of word-lines by vertical word-line cut regions VWLC1 extending in the second direction HD2.

The memory block BLK may be defined by the word-line cut regions WLC12 and WLC13 extending in the first direction HD1.

Although not illustrated, a dummy block and a through hole via region may be disposed consecutively in the second direction HD2 adjacent to the memory block BLK.

The control circuit 450 in FIG. 2 may use the second edge sub-block ESBLK2 corresponding to a non-adjacent edge sub-block as a sub-block to store data.

Figure 27:
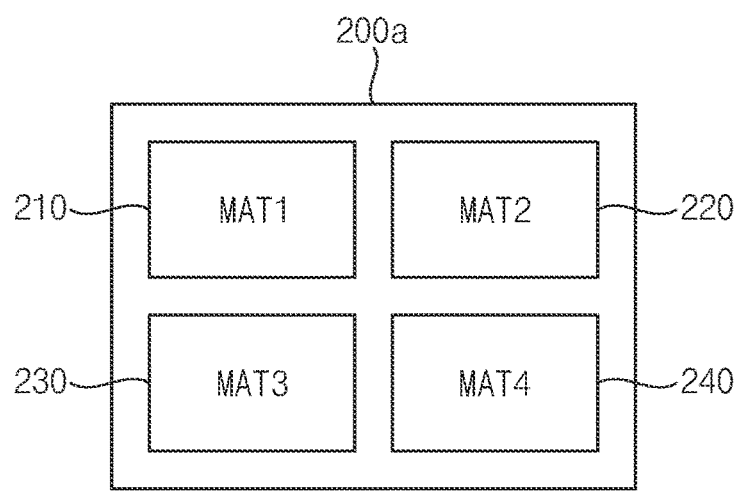
FIG. 27 is a block diagram illustrating an example of a memory cell array according to example embodiments.

FIG. 27 is a block diagram illustrating an example of a memory cell array according to example embodiments.

Referring to FIG. 27, a memory cell array 200*a* may include a plurality of mats MAT1 210, MAT2 220, MAT3 230 and MAT4 240 corresponding to different bit-lines and each of the plurality of mats 210, 220, 230 and 240 may include a plurality of nonvolatile memory cells coupled to a plurality word-lines and a plurality bit-lines.

Figure 28:
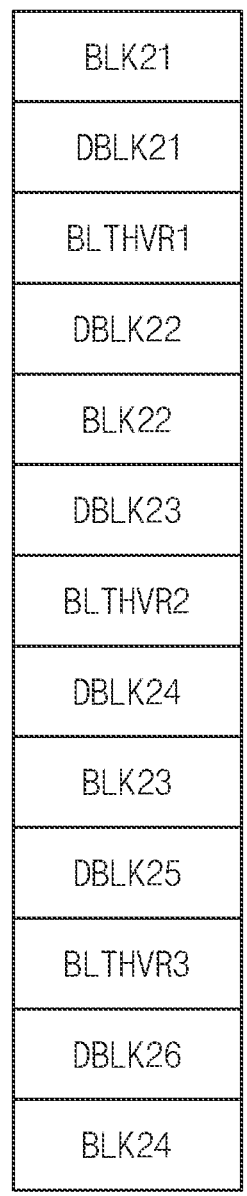
FIG. 28 is a plan view illustrating a configuration of one of the plurality of mats in FIG. 27 according to example embodiments.
Figure 28:
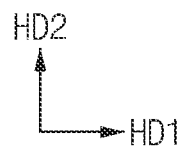

FIG. 28 is a plan view illustrating a configuration of one of the plurality of mats in FIG. 27 according to example embodiments.

In FIG. 28, a configuration of mat 210*a* is explained as an example of the mat 210 and a configuration of each of the mats 220, 230 and 240 may be substantially the same as the configuration of the mat 210*a*.

Referring to FIG. 28, the mat 210*a* may include may include a plurality memory blocks BLK21, BLK22, BLK23 and BLK24 extending in the first direction HD1 and being spaced apart from each other in the second direction HD2. The mat 210*a* may also include through-hole via regions BLTHVR1, BLTHVR2 and BLTHVR3 in which bit-line through-hole vias BLTHV are provided, and a plurality of dummy blocks DBLK21, DBLK22, DBLK23, DBLK24, DBLK25 and DBLK26 that separate each of the plurality memory blocks BLK21, BLK22, BLK23 and BLK24 from the through-hole via regions BLTHVR1, BLTHVR2 and BLTHVR3.

In FIG. 28, word-line cuts are not illustrated for convenience of explanation.

The control circuit 450 in FIG. 2 may divide each of the dummy blocks DBLK21 and DBLK22 into an adjacent sub-block and one or more non-adjacent sub-blocks based on a relative distance from the through-hole via region BLTHVR1 in the second direction HD2. The control circuit 450 in FIG. 2 may divide each of the dummy blocks DBLK23 and DBLK24 into an adjacent sub-block and one or more non-adjacent sub-blocks based on a relative distance from the through-hole via region BLTHVR2 in the second direction HD2. The control circuit 450 in FIG. 2 may divide each of the dummy blocks DBLK25 and DBLK23 into an adjacent sub-block and one or more non-adjacent sub-blocks based on a relative distance from the through-hole via region BLTHVR3 in the second direction HD2.

The control circuit 450 may use each of the non-adjacent sub-blocks in each of the dummy blocks DBLK21, DBLK22, DBLK23, DBLK24, DBLK25 and DBLK26 as a sub-block to store data.

Figure 29:
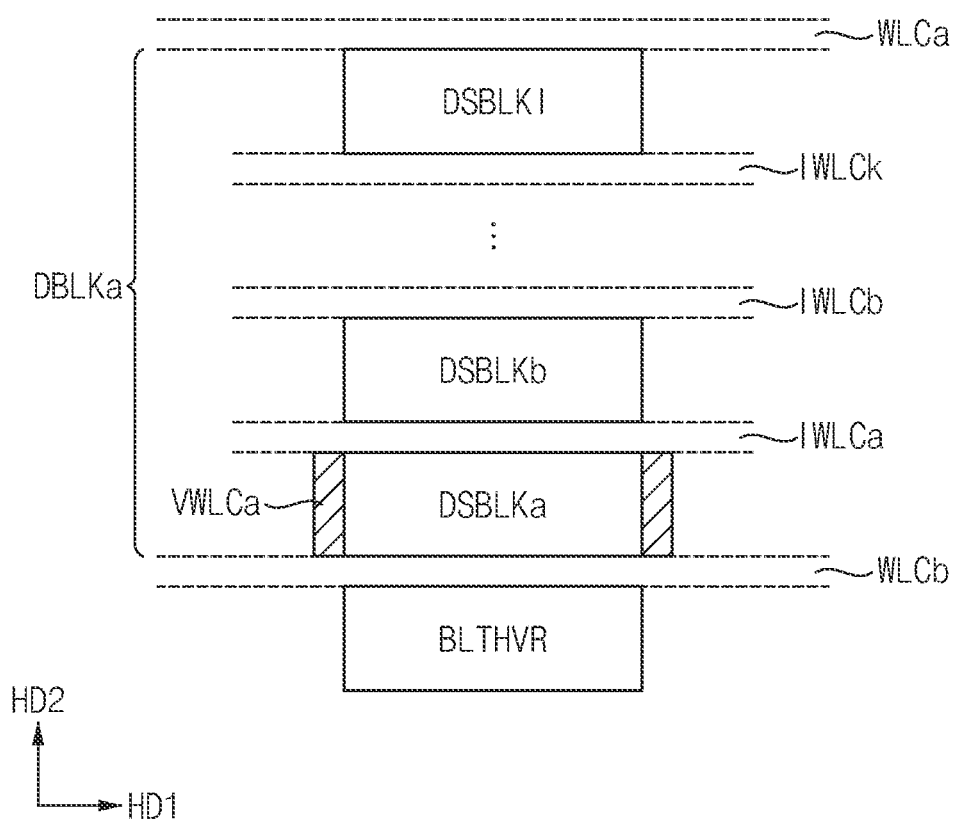
FIG. 29 illustrates a through-hole via region and a dummy block adjacent to the through-hole via region in the mat of FIG. 28 according to example embodiments.

FIG. 29 illustrates a through-hole via region and a dummy block adjacent to the through-hole via region in the mat of FIG. 28.

Referring to FIG. 29, a dummy block DBLKa adjacent to a through-hole via region BLTHVR in the second direction HD2 may be divided into a plurality of dummy sub-blocks DSBLKa, DSBLKb, ..., DSBLK1 by a plurality of internal word-line cut regions IWLCa, IWLCb, ..., IWLCk extending in the first direction HD1. Here, 1 is a natural number greater than two and k is a natural number greater than one.

The dummy sub-block DSBLKa may correspond to an adjacent sub-block and the dummy sub-blocks DSBLKb, ..., DSBLK1 may correspond to non-adjacent sub-blocks. The dummy sub-block DSBLKa may be isolated from the word-lines by vertical word-line cut regions VWLCa.

The control circuit 450 in FIG. 2 may control a size of the sub-block including a portion of the dummy sub-blocks DSBLKb, ..., DSBLK1 corresponding to non-adjacent sub-blocks based on the internal word-line cut regions IWLCa, IWLCb, ..., IWLCk. For example, the control circuit 450 may use one of the dummy sub-blocks DSBLKb, ..., DSBLK1 as one sub-block or may use two or more of the dummy sub-blocks DSBLKb, ..., DSBLK1 as one sub-block. In this regard, the size of the sub-block may vary.

Therefore, the nonvolatile memory device according to example embodiments may use a portion of dummy blocks adjacent to the through-hole via region as a sub-block to store data, which exist for structural and process stabilization, and thus may reduce a size of spare block provided separately by a nonvolatile memory device and may improve the number of gross die which can be obtained from a single wafer.

Figure 30:
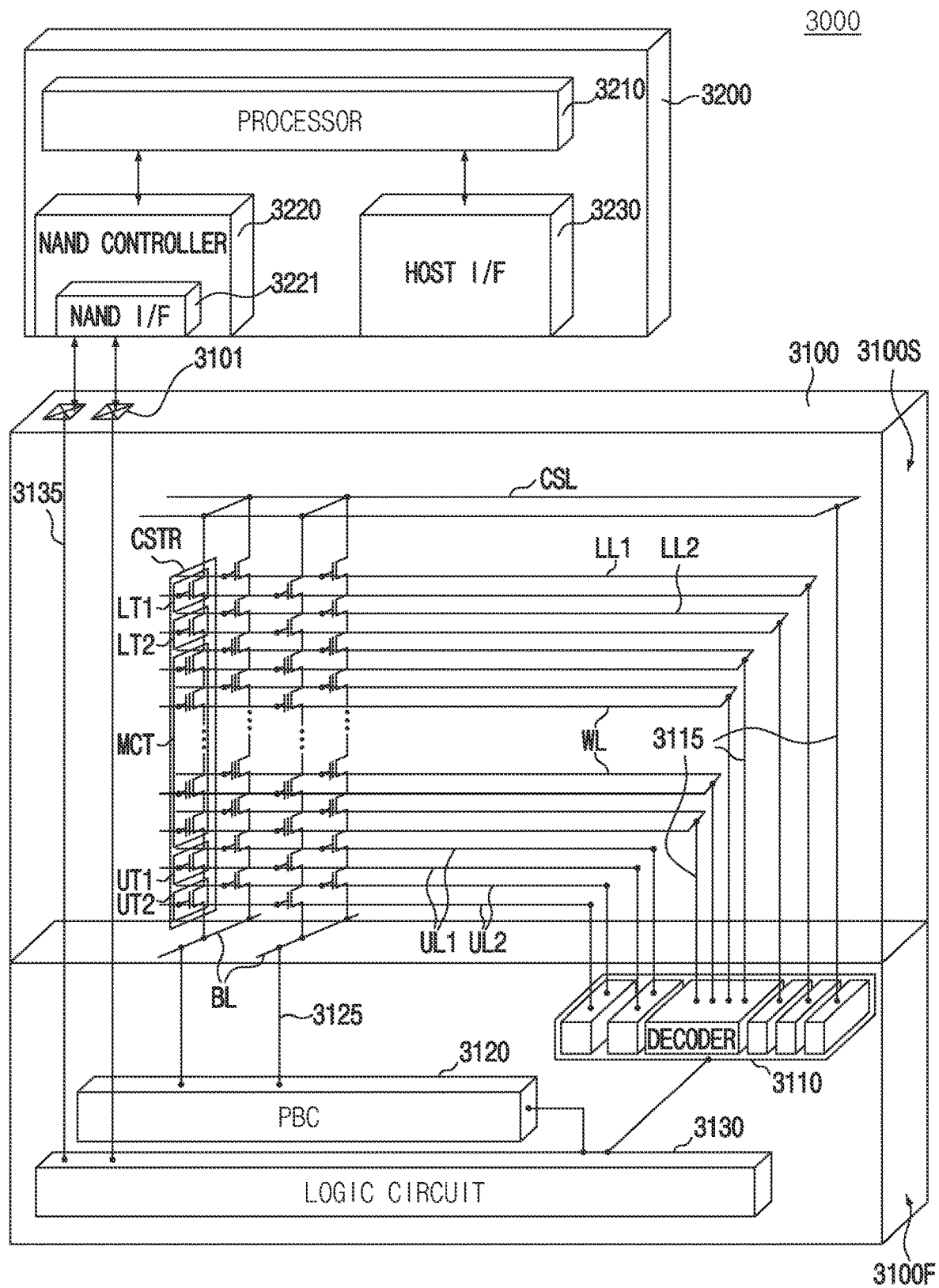
FIG. 30 is a block diagram illustrating an electronic system including a semiconductor device according to example embodiments.

FIG. 30 is a block diagram illustrating an electronic system including a semiconductor device according to example embodiments.

Referring to FIG. 30, an electronic system 3000 may include a semiconductor device 3100 and a controller 3200 electrically connected to the semiconductor device 3100. The electronic system 3000 may be a storage device including one or a plurality of semiconductor devices 3100 or an electronic device including a storage device. For example, the electronic system 3000 may be a solid state drive (SSD) device, a universal serial bus (USB) device, a computing system, a medical device, or a communication device that may include one or a plurality of semiconductor devices 3100.

The semiconductor device 3100 may be a non-volatile memory device, for example, a NAND flash memory device. The semiconductor device 3100 may include a first structure 3100F and a second structure 3100S on the first structure 3100F. The first structure 3100F may be a peripheral circuit structure including a decoder circuit 3110, a page buffer circuit 3120, and a logic circuit 3130. The second structure 3100S may be a memory cell structure including a bit-line BL, a common source line CSL, word-lines WL, first and second upper gate lines UL1 and UL2, first and second lower gate lines LL1 and LL2, and (memory) cell strings CSTR between the bit line BL and the common source line CSL.

In the second structure 3100S, each of the memory cell strings CSTR may include lower transistors LT1 and LT2 adjacent to the common source line CSL, upper transistors UT1 and UT2 adjacent to the bit-line BL, and a plurality of memory cell transistors MCT between the lower transistors LT1 and LT2 and the upper transistors UT1 and UT2. The number of the lower transistors LT1 and LT2 and the number of the upper transistors UT1 and UT2 may be varied in accordance with example embodiments.

In example embodiments, the upper transistors UT1 and UT2 may include string selection transistors, and the lower transistors LT1 and LT2 may include ground selection transistors. The lower gate lines LL1 and LL2 may be gate electrodes of the lower transistors LT1 and LT2, respectively. The word lines WL may be gate electrodes of the memory cell transistors MCT, respectively, and the upper gate lines UL1 and UL2 may be gate electrodes of the upper transistors UT1 and UT2, respectively.

In example embodiments, the lower transistors LT1 and LT2 may include a lower erase control transistor LT1 and a ground selection transistor LT2 that may be connected with each other in serial. The upper transistors UT1 and UT2 may include a string selection transistor UT1 and an upper erase control transistor UT2. At least one of the lower erase control transistor LT1 and the upper erase control transistor UT2 may be used in an erase operation for erasing data stored in the memory cell transistors MCT through gate induced drain leakage (GIDL) phenomenon.

The common source line CSL, the first and second lower gate lines LL1 and LL2, the word lines WL, and the first and second upper gate lines UL1 and UL2 may be electrically connected to the decoder circuit 3110 through first connection wirings 1115 extending to the second structure 3110S in the first structure 3100F. The bit-lines BL may be electrically connected to the page buffer circuit 3120 through second connection wirings 3125 extending to the second structure 3100S in the first structure 3100F.

In the first structure 3100F, the decoder circuit 3110 and the page buffer circuit 3120 may perform a control operation for at least one selected memory cell transistor among the plurality of memory cell transistors MCT. The decoder circuit 3110 and the page buffer circuit 3120 may be controlled by the logic circuit 3130. The semiconductor device 3100 may communicate with the controller 3200 through an input/output pad 3101 electrically connected to the logic circuit 3130. The input/output pad 3101 may be electrically connected to the logic circuit 3130 through an input/output connection wiring 3135 extending to the second structure 3100S in the first structure 3100F.

The controller 3200 may include a processor 3210, a NAND controller 3220, and a host interface 3230. The electronic system 3000 may include a plurality of semiconductor devices 3100, and in this case, the controller 3200 may control the plurality of semiconductor devices 3100.

The processor 3210 may control operations of the electronic system 3000 including the controller 3200. The processor 3210 may be operated by firmware, and may control the NAND controller 3220 to access the semiconductor device 3100. The NAND controller 3220 may include a NAND interface 3221 for communicating with the semiconductor device 3100. Through the NAND interface 3221, control command for controlling the semiconductor device 3100, data to be written in the memory cell transistors MCT of the semiconductor device 3100, data to be read from the memory cell transistors MCT of the semiconductor device 3100, etc., may be transferred. The host interface 3230 may provide communication between the electronic system 3000 and an outside host. When control command is received from the outside host through the host interface 3230, the processor 3210 may control the semiconductor device 3100 in response to the control command.

Figure 31:
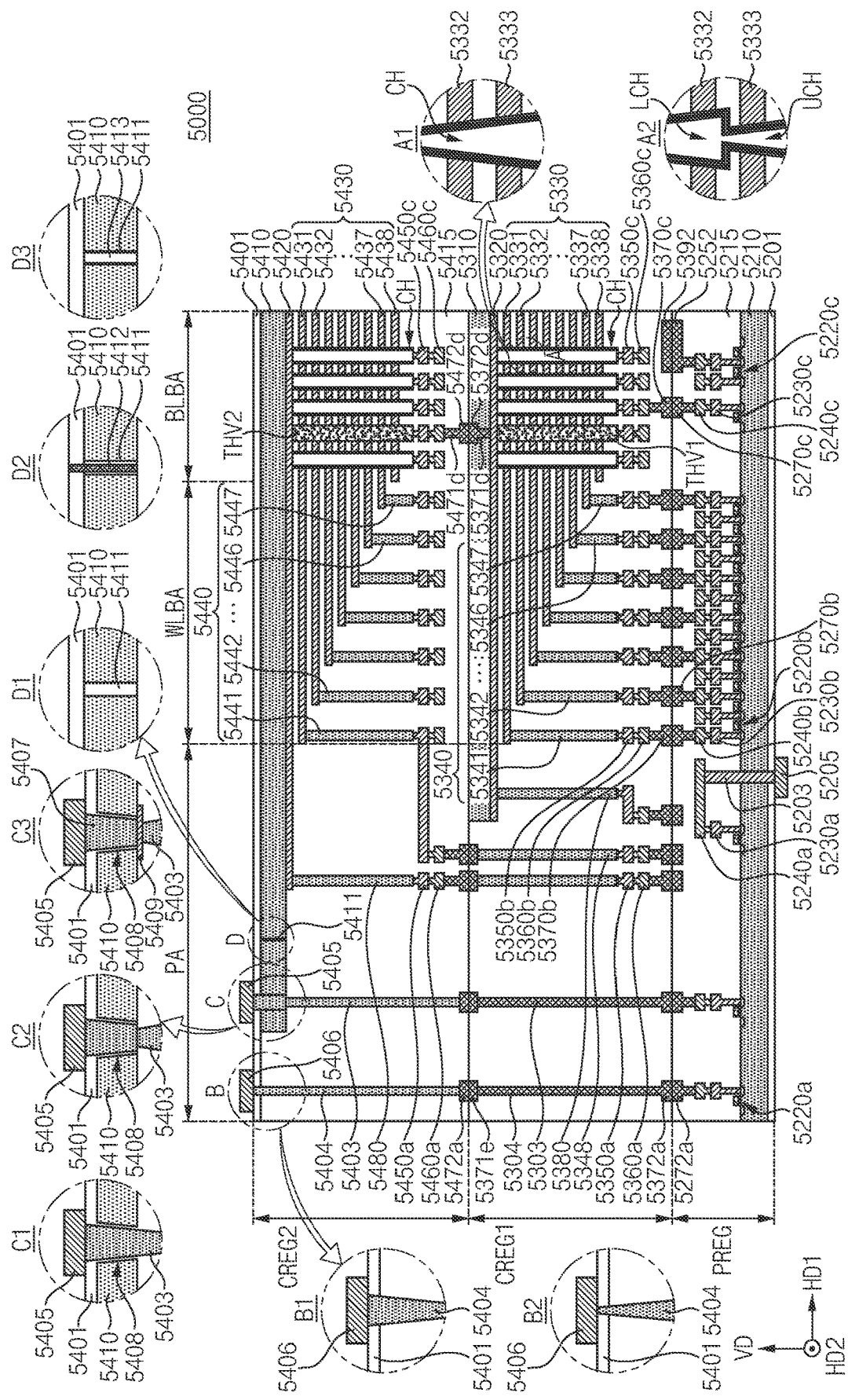
FIG. 31 is a cross-sectional view of a nonvolatile memory device according to example embodiments.

FIG. 31 is a cross-sectional view of a nonvolatile memory device according to example embodiments.

Referring to FIG. 31, a nonvolatile memory device 5000 (which will be referred to as a memory device, hereafter) may have a chip-to-chip (C2C) structure. At least one upper chip including a cell region and a lower chip including a peripheral circuit region PREG may be manufactured separately, and then, the at least one upper chip and the lower chip may be connected to each other by a bonding method to realize the C2C structure. For example, the bonding method may include a method of electrically or physically connecting a bonding metal pattern formed in an uppermost metal layer of the upper chip to a bonding metal pattern formed in an uppermost metal layer of the lower chip. For example, in a case in which the bonding metal patterns are formed of copper (Cu), the bonding method may be a Cu—Cu bonding method. Alternatively, the bonding metal patterns may be formed of a metal, such as aluminum (Al) or tungsten (W).

The memory device 5000 may include the at least one upper chip including the cell region. For example, as illustrated in FIG. 31, the memory device 5000 may include two upper chips. However, the number of the upper chips is not limited thereto. In the case in which the memory device 5000 includes the two upper chips, a first upper chip including a first cell region CREG1, a second upper chip including a second cell region CREG2 and the lower chip including the peripheral circuit region PREG may be manufactured separately, and then, the first upper chip, the second upper chip and the lower chip may be connected to each other by the bonding method to manufacture the memory device 5000. The first upper chip may be turned over and then may be connected to the lower chip by the bonding method, and the second upper chip may also be turned over and then may be connected to the first upper chip by the bonding method. Hereinafter, upper and lower portions of each of the first and second upper chips will be defined based on before each of the first and second upper chips is turned over. In this regard, an upper portion of the lower chip may indicate an upper portion defined based on a + third direction VD, and the upper portion of each of the first and second upper chips may indicate an upper portion defined based on a—third direction VD in FIG. 31. However, example embodiments are not limited thereto. In some example embodiments, one of the first upper chip and the second upper chip may be turned over and then may be connected to a corresponding chip by the bonding method.

Each of the peripheral circuit region PREG and the first and second cell regions CREG1 and CREG2 of the memory device 5000 may include an external pad bonding region PA, a word-line bonding region WLBA, and a bit-line bonding region BLBA.

The peripheral circuit region PREG may include a first substrate 5210 and a plurality of circuit elements 5220a, 5220b and 5220c formed on the first substrate 5210. An interlayer insulating layer 5215 including one or more insulating layers may be provided on the plurality of circuit elements 5220a, 5220b and 5220c, and a plurality of metal lines electrically connected to the plurality of circuit elements 5220a, 5220b and 5220c may be provided in the interlayer insulating layer 5215. For example, the plurality of metal lines may include first metal lines 5230a, 5230b and 5230c connected to the plurality of circuit elements 5220a,

5220*b* and 5220*c*, and second metal lines 5240*a*, 5240*b* and 5240*c* formed on the first metal lines 5230*a*, 5230*b* and 5230*c*. The plurality of metal lines may be formed of at least one of various conductive materials. For example, the first metal lines 5230*a*, 5230*b* and 5230*c* may be formed of tungsten having a relatively high electrical resistivity, and the second metal lines 5240*a*, 5240*b* and 5240*c* may be formed of copper having a relatively low electrical resistivity.

Examples of the first metal lines 5230*a*, 5230*b* and 5230*c* and the second metal lines 5240*a*, 5240*b* and 5240*c* are illustrated and described. However, example embodiments are not limited thereto. In some example embodiments, at least one or more additional metal lines may further be formed on the second metal lines 5240*a*, 5240*b* and 5240*c*. In this case, the second metal lines 5240*a*, 5240*b* and 5240*c* may be formed of aluminum, and at least some of the additional metal lines formed on the second metal lines 5240*a*, 5240*b* and 5240*c* may be formed of copper having an electrical resistivity lower than that of aluminum of the second metal lines 5240*a*, 5240*b* and 5240*c*.

The interlayer insulating layer 5215 may be disposed on the first substrate 5210 and may include an insulating material such as silicon oxide and/or silicon nitride.

Each of the first and second cell regions CREG1 and CREG2 may include at least one memory block. The first cell region CREG1 may include a second substrate 5310 and a common source line 5320. A plurality of word-lines 5330 (5331 to 5338) may be stacked on the second substrate 5310 in a direction (i.e., the third direction VD) perpendicular to a top surface of the second substrate 5310. String selection lines and a ground selection line may be disposed on and under the word-lines 5330, and the plurality of word-lines 5330 may be disposed between the string selection lines and the ground selection line. Likewise, the second cell region CREG2 may include a third substrate 5410 and a common source line 5420, and a plurality of word-lines 5430 (5431 to 5438) may be stacked on the third substrate 5410 in a direction (i.e., the third direction VD) perpendicular to a top surface of the third substrate 5410. Each of the second substrate 5310 and the third substrate 5410 may be formed of at least one of various materials and may be, for example, a silicon substrate, a silicon-germanium substrate, a germanium substrate, or a substrate having a single-crystalline epitaxial layer grown on a single-crystalline silicon substrate. A plurality of channel structures CH may be formed in each of the first and second cell regions CREG1 and CREG2.

In some example embodiments, as illustrated in a region 'A1', the channel structure CH may be provided in the bit-line bonding region BLBA and may extend in the direction perpendicular to the top surface of the second substrate 5310 to penetrate the word-lines 5330, the string selection lines, and the ground selection line. The channel structure CH may include a data storage layer, a channel layer, and a filling insulation layer. The channel layer may be electrically connected to a first metal line 5350*c* and a second metal line 5360*c* in the bit-line bonding region BLBA. For example, the second metal line 5360*c* may be a bit-line and may be connected to the channel structure CH through the first metal line 5350*c*. The bit-line 5360*c* may extend in a second direction HD2 parallel to the top surface of the second substrate 5310.

In some example embodiments, as illustrated in a region 'A2', the channel structure CH may include a lower channel LCH and an upper channel UCH, which are connected to each other. For example, the channel structure CH may be formed by a process of forming the lower channel LCH and a process of forming the upper channel UCH. The lower channel LCH may extend in the direction perpendicular to the top surface of the second substrate 5310 to penetrate the common source line 5320 and lower word-lines 5331 and 5332. The lower channel LCH may include a data storage layer, a channel layer, and a filling insulation layer and may be connected to the upper channel UCH. The upper channel UCH may penetrate upper word-lines 5333 to 5338. The upper channel UCH may include a data storage layer, a channel layer, and a filling insulation layer, and the channel layer of the upper channel UCH may be electrically connected to the first metal line 5350*c* and the second metal line 5360*c*. As a length of a channel increases, due to characteristics of manufacturing processes, it may be difficult to form a channel having a substantially uniform width. The memory device 5000 according to example embodiments may include a channel having improved width uniformity due to the lower channel LCH and the upper channel UCH which are formed by the processes performed sequentially.

In the case in which the channel structure CH includes the lower channel LCH and the upper channel UCH as illustrated in the region 'A2', a word-line located near to a boundary between the lower channel LCH and the upper channel UCH may be a dummy word-line. For example, the word-lines 5332 and 5333 adjacent to the boundary between the lower channel LCH and the upper channel UCH may be the dummy word-lines. In this case, data may not be stored in memory cells connected to the dummy word-line. Alternatively, the number of pages corresponding to the memory cells connected to the dummy word-line may be less than the number of pages corresponding to the memory cells connected to a general word-line. A level of a voltage applied to the dummy word-line may be different from a level of a voltage applied to the general word-line, and thus it is possible to reduce an influence of a non-uniform channel width between the lower and upper channels LCH and UCH on an operation of the memory device.

The number of the lower word-lines 5331 and 5332 penetrated by the lower channel LCH is less than the number of the upper word-lines 5333 to 5338 penetrated by the upper channel UCH in the region 'A2'. However, example embodiments are not limited thereto. In some example embodiments, the number of the lower word-lines penetrated by the lower channel LCH may be equal to or more than the number of the upper word-lines penetrated by the upper channel UCH. In addition, structural features and connection relation of the channel structure CH disposed in the second cell region CREG2 may be substantially the same as those of the channel structure CH disposed in the first cell region CREG1.

In the bit-line bonding region BLBA, a first through-electrode THV1 may be provided in the first cell region CREG1, and a second through-electrode THV2 may be provided in the second cell region CREG2. As illustrated in FIG. 31, the first through-electrode THV1 may penetrate the common source line 5320 and the plurality of word-lines 5330. In some example embodiments, the first through-electrode THV1 may further penetrate the second substrate 5310. The first through-electrode THV1 may include a conductive material. Alternatively, the first through-electrode THV1 may include a conductive material surrounded by an insulating material. The second through-electrode THV2 may have the same shape and structure as the first through-electrode THV1.

In some example embodiments, the first through-electrode THV1 and the second through-electrode THV2 may be electrically connected to each other through a first through-metal pattern 5372d and a second through-metal pattern 5472d. The first through-metal pattern 5372d may be formed at a bottom end of the first upper chip including the first cell region CREG1, and the second through-metal pattern 5472d may be formed at a top end of the second upper chip including the second cell region CREG2. The first through-electrode THV1 may be electrically connected to the first metal line 5350c and the second metal line 5360c. A lower via 5371d may be formed between the first through-electrode THV1 and the first through-metal pattern 5372d, and an upper via 5471d may be formed between the second through-electrode THV2 and the second through-metal pattern 5472d. The first through-metal pattern 5372d and the second through-metal pattern 5472d may be connected to each other by the bonding method.

In addition, in the bit-line bonding region BLBA, an upper metal pattern 5252 may be formed in an uppermost metal layer of the peripheral circuit region PERI, and an upper metal pattern 5392 having the same shape as the upper metal pattern 5252 may be formed in an uppermost metal layer of the first cell region CREG1. The upper metal pattern 5392 of the first cell region CREG1 and the upper metal pattern 5252 of the peripheral circuit region PREG may be electrically connected to each other by the bonding method. In the bit-line bonding region BLBA, the bit-line 5360c may be electrically connected to a page buffer included in the peripheral circuit region PERI. For example, some of the circuit elements 5220c of the peripheral circuit region PREG may constitute the page buffer, and the bit-line 5360c may be electrically connected to the circuit elements 5220c constituting the page buffer through an upper bonding metal pattern 5370c of the first cell region CREG1 and an upper bonding metal pattern 5270c of the peripheral circuit region PERI.

Referring continuously to FIG. 31, in the word-line bonding region WLBA, the word-lines 5330 of the first cell region CREG1 may extend in a first direction HD1 parallel to the top surface of the second substrate 5310 and may be connected to a plurality of cell contact plugs 5340 (5341 to 5347). First metal lines 5350b and second metal lines 5360b may be sequentially connected onto the cell contact plugs 5340 connected to the word-lines 5330. In the word-line bonding region WLBA, the cell contact plugs 5340 may be connected to the peripheral circuit region PREG through upper bonding metal patterns 5370b of the first cell region CREG1 and upper bonding metal patterns 5270b of the peripheral circuit region PERI.

The cell contact plugs 5340 may be electrically connected to a row decoder included in the peripheral circuit region PERI. For example, some of the circuit elements 5220b of the peripheral circuit region PREG may constitute the row decoder, and the cell contact plugs 5340 may be electrically connected to the circuit elements 5220b constituting the row decoder through the upper bonding metal patterns 5370b of the first cell region CREG1 and the upper bonding metal patterns 5270b of the peripheral circuit region PERI. In some example embodiments, an operating voltage of the circuit elements 5220b constituting the row decoder may be different from an operating voltage of the circuit elements 5220c constituting the page buffer. For example, the operating voltage of the circuit elements 5220c constituting the page buffer may be greater than the operating voltage of the circuit elements 5220b constituting the row decoder.

Likewise, in the word-line bonding region WLBA, the word-lines 5430 of the second cell region CREG2 may extend in the first direction HD1 parallel to the top surface of the third substrate 5410 and may be connected to a plurality of cell contact plugs 5440 (5441 to 5447). The cell contact plugs 5440 may be connected to the peripheral circuit region PREG through an upper metal pattern of the second cell region CREG2 and lower and upper metal patterns and a cell contact plug 5348 of the first cell region CREG1.

In the word-line bonding region WLBA, the upper bonding metal patterns 5370b may be formed in the first cell region CREG1, and the upper bonding metal patterns 5270b may be formed in the peripheral circuit region PERI. The upper bonding metal patterns 5370b of the first cell region CREG1 and the upper bonding metal patterns 5270b of the peripheral circuit region PREG may be electrically connected to each other by the bonding method. The upper bonding metal patterns 5370b and the upper bonding metal patterns 5270b may be formed of at least one metal, such as aluminum, copper, or tungsten.

In the external pad bonding region PA, a lower metal pattern 5371e may be formed in a lower portion of the first cell region CREG1, and an upper metal pattern 5472a may be formed in an upper portion of the second cell region CREG2. The lower metal pattern 5371e of the first cell region CREG1 and the upper metal pattern 5472a of the second cell region CREG2 may be connected to each other by the bonding method in the external pad bonding region PA. Likewise, an upper metal pattern 5372a may be formed in an upper portion of the first cell region CREG1, and an upper metal pattern 5272a may be formed in an upper portion of the peripheral circuit region PERI. The upper metal pattern 5372a of the first cell region CREG1 and the upper metal pattern 5272a of the peripheral circuit region PREG may be connected to each other by the bonding method.

Common source line contact plugs 5380 and 5480 may be disposed in the external pad bonding region PA. The common source line contact plugs 5380 and 5480 may be formed of a conductive material such as a metal, a metal compound, and/or doped polysilicon. The common source line contact plug 5380 of the first cell region CREG1 may be electrically connected to the common source line 5320, and the common source line contact plug 5480 of the second cell region CREG2 may be electrically connected to the common source line 5420. A first metal line 5350a and a second metal line 5360a may be sequentially stacked on the common source line contact plug 5380 of the first cell region CREG1, and a first metal line 5450a and a second metal line 5460a may be sequentially stacked on the common source line contact plug 5480 of the second cell region CREG2.

Input/output pads 5205, 5405 and 5406 may be disposed in the external pad bonding region PA. Referring to FIG. 31, a lower insulating layer 5201 may cover a bottom surface of the first substrate 5210, and a first input/output pad 5205 may be formed on the lower insulating layer 5201. The first input/output pad 5205 may be connected to at least one of a plurality of the circuit elements 5220a disposed in the peripheral circuit region PREG through a first input/output contact plug 5203 and may be separated from the first substrate 5210 by the lower insulating layer 5201. In addition, a side insulating layer may be disposed between the first input/output contact plug 5203 and the first substrate 5210 to electrically isolate the first input/output contact plug 5203 from the first substrate 5210.

An upper insulating layer 5401 covering a top surface of the third substrate 5410 may be formed on the third substrate 5410. A second input/output pad 5405 and/or a third input/output pad 5406 may be disposed on the upper insulating layer 5401. The second input/output pad 5405 may be connected to at least one of the plurality of circuit elements 5220a disposed in the peripheral circuit region PREG through second input/output contact plugs 5403 and 5303, and the third input/output pad 5406 may be connected to at least one of the plurality of circuit elements 5220a disposed in the peripheral circuit region PREG through third input/output contact plugs 5404 and 5304.

In some example embodiments, the third substrate 5410 may not be disposed in a region in which the input/output contact plug is disposed. For example, as illustrated in a region T', the third input/output contact plug 5404 may be separated from the third substrate 5410 in a direction parallel to the top surface of the third substrate 5410 and may penetrate an interlayer insulating layer 5415 of the second cell region CREG2 so as to be connected to the third input/output pad 5406. In this case, the third input/output contact plug 5404 may be formed by at least one of various processes.

In some example embodiments, as illustrated in a region 131', the third input/output contact plug 5404 may extend in the third direction VD, and a diameter of the third input/output contact plug 5404 may become progressively greater toward the upper insulating layer 5401. In this regard, a diameter of the channel structure CH described in the region 'A1' may become progressively less toward the upper insulating layer 5401, but the diameter of the third input/output contact plug 5404 may become progressively greater toward the upper insulating layer 5401. For example, the third input/output contact plug 5404 may be formed after the second cell region CREG2 and the first cell region CREG1 are bonded to each other by the bonding method.

In some example embodiments, as illustrated in a region 132', the third input/output contact plug 5404 may extend in the third direction VD, and a diameter of the third input/output contact plug 5404 may become progressively less toward the upper insulating layer 5401. In this regard, like the channel structure CH, the diameter of the third input/output contact plug 5404 may become progressively less toward the upper insulating layer 5401. For example, the third input/output contact plug 5404 may be formed together with the cell contact plugs 5440 before the second cell region CREG2 and the first cell region CREG1 are bonded to each other.

In some example embodiments, the input/output contact plug may overlap with the third substrate 5410. For example, as illustrated in a region 'C', the second input/output contact plug 5403 may penetrate the interlayer insulating layer 5415 of the second cell region CREG2 in the third direction VD and may be electrically connected to the second input/output pad 5405 through the third substrate 5410. In this case, a connection structure of the second input/output contact plug 5403 and the second input/output pad 5405 may be realized by various methods.

In some example embodiments, as illustrated in a region 'C1', an opening 5408 may be formed to penetrate the third substrate 5410, and the second input/output contact plug 5403 may be connected directly to the second input/output pad 5405 through the opening 5408 formed in the third substrate 5410. In this case, as illustrated in the region 'C1', a diameter of the second input/output contact plug 5403 may become progressively greater toward the second input/output pad 5405. However, example embodiments are not limited thereto, and in some example embodiments, the diameter of the second input/output contact plug 5403 may become progressively less toward the second input/output pad 5405.

In some example embodiments, as illustrated in a region 'C2', the opening 5408 penetrating the third substrate 5410 may be formed, and a contact 5407 may be formed in the opening 5408. An end of the contact 5407 may be connected to the second input/output pad 5405, and another end of the contact 5407 may be connected to the second input/output contact plug 5403. Thus, the second input/output contact plug 5403 may be electrically connected to the second input/output pad 5405 through the contact 5407 in the opening 5408. In this case, as illustrated in the region 'C2', a diameter of the contact 5407 may become progressively greater toward the second input/output pad 5405, and a diameter of the second input/output contact plug 5403 may become progressively less toward the second input/output pad 5405. For example, the second input/output contact plug 5403 may be formed together with the cell contact plugs 5440 before the second cell region CREG2 and the first cell region CREG1 are bonded to each other, and the contact 5407 may be formed after the second cell region CREG2 and the first cell region CREG1 are bonded to each other.

In some example embodiments illustrated in a region 'C3', a stopper 5409 may further be formed on a bottom end of the opening 5408 of the third substrate 5410, as compared with the region 'C2'. The stopper 5409 may be a metal line formed in the same layer as the common source line 5420. Alternatively, the stopper 5409 may be a metal line formed in the same layer as at least one of the word-lines 5430. The second input/output contact plug 5403 may be electrically connected to the second input/output pad 5405 through the contact 5407 and the stopper 5409.

Like the second and third input/output contact plugs 5403 and 5404 of the second cell region CREG2, a diameter of each of the second and third input/output contact plugs 5303 and 5304 of the first cell region CREG1 may become progressively less toward the lower metal pattern 5371e or may become progressively greater toward the lower metal pattern 5371e.

In some example embodiments, a slit 5411 may be formed in the third substrate 5410. For example, the slit 5411 may be formed at a certain position of the external pad bonding region PA. For example, as illustrated in a region 'D', the slit 5411 may be located between the second input/output pad 5405 and the cell contact plugs 5440 when viewed in a plan view. Alternatively, the second input/output pad 5405 may be located between the slit 5411 and the cell contact plugs 5440 when viewed in a plan view.

In some example embodiments, as illustrated in a region 'D1', the slit 5411 may be formed to penetrate the third substrate 5410. For example, the slit 5411 may be used to prevent the third substrate 5410 from being finely cracked when the opening 5408 is formed. However, example embodiments are not limited thereto, and in some example embodiments, the slit 5411 may be formed to have a depth ranging from about 60% to about 70% of a thickness of the third substrate 5410.

In some example embodiments, as illustrated in a region 'D2', a conductive material 5412 may be formed in the slit 5411. For example, the conductive material 5412 may be used to discharge a leakage current occurring in driving of the circuit elements in the external pad bonding region PA to the outside. In this case, the conductive material 5412 may be connected to an external ground line.

In some example embodiments, as illustrated in a region 'D3', an insulating material 5413 may be formed in the slit 5411. For example, the insulating material 5413 may be used to electrically isolate the second input/output pad 5405 and the second input/output contact plug 5403 disposed in the external pad bonding region PA from the word-line bonding region WLBA. Because the insulating material 5413 is formed in the slit 5411, it is possible to prevent a voltage provided through the second input/output pad 5405 from affecting a metal layer disposed on the third substrate 5410 in the word-line bonding region WLBA.

In some example embodiments, the first to third input/output pads 5205, 5405 and 5406 may be selectively formed. For example, the memory device 5000 may be realized to include only the first input/output pad 5205 disposed on the first substrate 5210, to include only the second input/output pad 5405 disposed on the third substrate 5410, or to include only the third input/output pad 5406 disposed on the upper insulating layer 5401.

In some example embodiments, at least one of the second substrate 5310 of the first cell region CREG1 or the third substrate 5410 of the second cell region CREG2 may be used as a sacrificial substrate and may be completely or partially removed before or after a bonding process. An additional layer may be stacked after the removal of the substrate. For example, the second substrate 5310 of the first cell region CREG1 may be removed before or after the bonding process of the peripheral circuit region PREG and the first cell region CREG1, and then, an insulating layer covering a top surface of the common source line 5320 or a conductive layer for connection may be formed. Likewise, the third substrate 5410 of the second cell region CREG2 may be removed before or after the bonding process of the first cell region CREG1 and the second cell region CREG2, and then, the upper insulating layer 5401 covering a top surface of the common source line 5420 or a conductive layer for connection may be formed.

A nonvolatile memory device or a storage device according to example embodiments may be packaged using various package types or package configurations.

The present disclosure be applied to various devices and systems that include the nonvolatile memory devices.

In some embodiments, each of the components represented by a block, such as those illustrated in FIGS. 1, 2, 8, 11, 12, 15, 16, 22-24, and 30 may be implemented as various numbers of hardware, software and/or firmware structures that execute respective functions described above, according to embodiments. For example, at least one of these components may include various hardware components including a digital circuit, a programmable or non-programmable logic device or array, an application specific integrated circuit (ASIC), transistors, capacitors, logic gates, or other circuitry using use a direct circuit structure, such as a memory, a processor, a logic circuit, a look-up table, etc., that may execute the respective functions through controls of one or more microprocessors or other control apparatuses. Also, at least one of these components may include a module, a program, or a part of code, which contains one or more executable instructions for performing specified logic functions, and executed by one or more microprocessors or other control apparatuses. Also, at least one of these components may further include or may be implemented by a processor such as a central processing unit (CPU) that performs the respective functions, a microprocessor, or the like. Functional aspects of example embodiments may be implemented in algorithms that execute on one or more processors. Furthermore, the components, elements, modules or units represented by a block or processing operations may employ any number of related art techniques for electronics configuration, signal processing and/or control, data processing and the like.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present disclosure. Accordingly, all such modifications are intended to be included within the scope of the present disclosure as defined in the claims.

What is claimed is:

1. A nonvolatile memory device comprising:
a first semiconductor layer comprising:
a plurality of word-lines extending in a first direction;
a plurality of bit-lines extending in a second direction that crosses the first direction; and
a memory cell array comprising one or more memory blocks spaced apart from each other in the second direction, one or more dummy blocks between the one or more memory blocks and a through-hole via region, the memory cell array being connected to the plurality of word-lines and the plurality of bit-lines; and
a second semiconductor layer under the first semiconductor layer in a third direction perpendicular to the first and second directions, the second semiconductor layer comprising:
a substrate;
an address decoder configured to control the memory cell array;
a page buffer circuit connected to the plurality of bit-lines through one or more bit-line through-hole vias formed in the through-hole via region; and
a control circuit configured to control the address decoder and the page buffer circuit,
wherein each of the one or more dummy blocks inte- includes an adjacent sub-block directly contacting the through-hole via region and a non-adjacent sub-block which are divided based on a relative distance from the through-hole via region in the second direction,
wherein the control circuit is further configured to use the non-adjacent sub-block of each of the one or more dummy blocks as a sub-block to store data, and
wherein the one or more memory blocks are separated from the one or more dummy blocks by word-line cut regions extending in the first direction.

2. The nonvolatile memory device of claim 1, wherein the one or more memory blocks, the through-hole via region and the one or more dummy blocks are separated by the word-line cut regions extending in the first direction,
wherein the adjacent sub-block and the non-adjacent sub-block in each of the one or more dummy blocks are separated by an internal word-line cut region extending in the first direction, and
wherein the adjacent sub-block of each of the one or more dummy blocks is isolated from the plurality of word-lines by a vertical word-line cut region extending in the second direction.

3. The nonvolatile memory device of claim 1, wherein the address decoder comprises:
a plurality of pass transistors connected to the plurality of word-lines; and
a plurality of dummy pass transistors connected to a plurality of dummy word-lines of the non-adjacent sub-block of each of the one or more dummy blocks.

4. The nonvolatile memory device of claim 1, wherein the one or more dummy blocks comprises:

a first dummy block adjacent to the through-hole via region in the second direction; and a second dummy block adjacent to the through-hole via region in the second direction, the through-hole via region being between the second dummy block and the first dummy block in the second direction, wherein the first dummy block comprises a first dummy sub-block corresponding to the adjacent sub-block and a second dummy sub-block corresponding to the non-adjacent sub-block, and the adjacent sub-block and a fourth dummy sub-block corresponding to the non-adjacent sub-block.

5. The nonvolatile memory device of claim 4, wherein the address decoder is further configured to:

control a high voltage to be applied to first dummy pass transistors connected to the second dummy sub-block through a first block word-line; and control the high voltage to be applied to second dummy pass transistors connected to the fourth dummy sub-block through a second block word-line.

6. The nonvolatile memory device of claim 5, wherein the control circuit is further configured to use the second dummy sub-block and the fourth dummy sub-block as individual sub blocks.

7. The nonvolatile memory device of claim 5, wherein the control circuit is further configured to repair at least one defective cells in the second dummy sub-block by using dummy memory cells in the fourth dummy sub-block.

8. The nonvolatile memory device of claim 4, wherein the address decoder is further configured to control a high voltage to be applied to first dummy pass transistors connected to the second dummy sub-block and second dummy pass transistors connected to the fourth dummy sub-block through one block word-line, and wherein the control circuit is further configured to use the second dummy sub-block and the fourth dummy sub-block as one memory block.

9. The nonvolatile memory device of claim 1, wherein the control circuit is further configured to store single bit data in the non-adjacent sub-block of each of the one or more dummy blocks or to store a firmware associated with operation of the nonvolatile memory device in the non-adjacent sub-block of each of the one or more dummy blocks.

10. The nonvolatile memory device of claim 1, wherein the control circuit is further configured to use the non-adjacent sub-block of each of the one or more dummy blocks as a power loss protector memory block to store at least one of a metadata and a user data for data back-up in response to a sudden power off event.

11. The nonvolatile memory device of claim 1, wherein a first memory block from among the one or more memory blocks comprises a cell region comprising a plurality of memory cells and a first extension region in a first side of the cell region, and wherein the address decoder is under the first extension region and comprises a plurality of first pass transistors configured to drive first word-lines connected to the first memory block.

12. The nonvolatile memory device of claim 11, wherein the first extension region comprises a first step zone adjacent to the first side, a second step zone, and a first flat zone between the first step zone and the second step zone, wherein each of the first step zone and the second step zone has a stepped shape that descends from the first side and a periphery of the first flat zone, respectively, and the first flat zone has a flat shape, wherein a plurality of through-hole contacts are provided in and penetrate the first step zone and the second step zone, and wherein the plurality of first pass transistors are electrically connected to the first word-lines through the plurality of through-hole contacts.

13. The nonvolatile memory device of claim 1, wherein a first non-adjacent sub-block from among the non-adjacent sub-block of each of the one or more dummy blocks comprises a cell region comprising a plurality of dummy memory cells and a first extension region provided in a first side of the cell region, and wherein the address decoder is provided under the first extension region and comprises first dummy pass transistors configured to drive first dummy word-lines connected to the first non-adjacent sub-block.

14. The nonvolatile memory device of claim 13, wherein the first extension region comprises a first step zone adjacent to the first side, a second step zone, and a first flat zone provided between the first step zone and the second step zone, wherein each of the first step zone and the second step zone has a stepped shape that descends from the first side and a periphery of the first flat zone, respectively, and the first flat zone has a flat shape, wherein a plurality of through-hole contacts are provided in and penetrate the first step zone and the second step zone, and wherein the first dummy pass transistors are electrically connected to the first dummy word-lines through the plurality of through-hole contacts.

15. The nonvolatile memory device of claim 1, wherein the second semiconductor layer further comprises a voltage generator configured to generate a high voltage and word-line voltages based on control signals, wherein the page buffer circuit is coupled to the memory cell array through the plurality of bit-lines, and is further configured to latch sensed data in a sensing operation, and wherein the control circuit is further configured to control the address decoder, the voltage generator and the page buffer circuit based on a command and an address.

16. The nonvolatile memory device of claim 1, wherein the control circuit is further configured to divide an edge memory block adjacent to a first edge in the first direction of the memory cell array, from among the one or more memory blocks, into an adjacent edge sub-block directly contacting the first edge and a non-adjacent edge sub-block based on a relative distance from the first edge in the second direction, and wherein the control circuit is further configured to use the non-adjacent edge sub-block as a sub-block to store data.

17. A nonvolatile memory device comprising:

a first semiconductor layer comprising:

a plurality of word-lines extending in a first direction;

a plurality of bit-lines extending in a second direction that crosses the first direction; and a memory cell array comprising one or more memory blocks spaced apart from each other in the second direction, one or more dummy blocks between the one or more memory blocks and a through-hole via region, the memory cell array being connected to the plurality of word-lines and the plurality of bit-lines; and a second semiconductor layer under the first semiconductor layer in a third direction perpendicular to the first and second directions, the second semiconductor layer comprising:
a substrate;
an address decoder configured to control the memory cell array;
a page buffer circuit connected to the plurality of bit-lines through one or more bit-line through-hole vias formed in the through-hole via region; and
a control circuit configured to control the address decoder and the page buffer circuit,
wherein an edge memory block adjacent to a first edge in the first direction of the memory cell array, from among the one or more memory blocks, includes an adjacent edge sub-block directly contacting the first edge and a non-adjacent edge sub-block which are divided based on a relative distance from the first edge in the second direction,
wherein the control circuit is further configured to use the non-adjacent edge sub-block as a sub-block to store data, and
wherein the one or more memory blocks are separated from the one or more dummy blocks by word-line cut regions extending in the first direction.

18. The nonvolatile memory device of claim 17, wherein the one or more memory blocks, the through-hole via region and the one or more dummy blocks are separated by the word-line cut regions extending in the first direction,
wherein the adjacent edge sub-block and the non-adjacent edge sub-block in the edge memory block are separated by an internal word-line cut region extending in the first direction, and
wherein the adjacent edge sub-block is separated from the plurality of word-lines by a vertical word-line cut region extending in the second direction.

19. A nonvolatile memory device comprising:
a first semiconductor layer comprising:
a plurality of word-lines extending in a first direction;
a plurality of bit-lines extending in a second direction that crosses the first direction;
a memory cell array comprising one or more memory blocks spaced apart from each other in the second direction, one or more dummy blocks between the one or more memory blocks and a through-hole via region, the memory cell array being connected to the plurality of word-lines and the plurality of bit-lines; and
a second semiconductor layer under the first semiconductor layer in a third direction perpendicular to the first and second directions, the second semiconductor layer comprising:
a substrate;
an address decoder configured to control the memory cell array;
a page buffer circuit connected to the plurality of bit-lines through one or more bit-line through-hole vias formed in the through-hole via region; and
a control circuit configured to control the address decoder and the page buffer circuit,
wherein the control circuit is further configured to:
divide each of the one or more dummy blocks into an adjacent sub-block directly contacting the through-hole via region and a non-adjacent sub-block based on a relative distance from the through-hole via region in the second direction; and
use the non-adjacent sub-block of each of the one or more dummy blocks as a sub-block to store data,
wherein the adjacent sub-block and the non-adjacent sub-block in each of the one or more dummy blocks are separated by an internal word-line cut region extending in the first direction, and
wherein the adjacent sub-block of each of the one or more dummy blocks is isolated from the plurality of word-lines by a vertical word-line cut region extending in the second direction.

20. The nonvolatile memory device of claim 19, wherein the control circuit is further configured to control a size of the non-adjacent sub-block based on the internal word-line cut region.

* * * * *